US009530548B2

(12) United States Patent
Taguchi

(10) Patent No.: US 9,530,548 B2
(45) Date of Patent: Dec. 27, 2016

(54) METHOD FOR MANUFACTURING SR FERRITE PARTICLE FOR SINTERED MAGNET, METHOD FOR USING SR FERRITE PARTICLE, SR FERRITE SINTERED MAGNET AND METHOD FOR MANUFACTURING SAME, AND MOTOR AND GENERATOR

(71) Applicant: TDK Corporation, Tokyo (JP)

(72) Inventor: Hitoshi Taguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 75 days.

(21) Appl. No.: 14/404,072

(22) PCT Filed: Jun. 7, 2013

(86) PCT No.: PCT/JP2013/065890
§ 371 (c)(1),
(2) Date: Nov. 26, 2014

(87) PCT Pub. No.: WO2013/183776
PCT Pub. Date: Dec. 12, 2013

(65) Prior Publication Data
US 2015/0125700 A1    May 7, 2015

(30) Foreign Application Priority Data

Jun. 7, 2012    (JP) .................................. 2012-129853

(51) Int. Cl.
*H01F 1/36* (2006.01)
*H01F 1/11* (2006.01)
*C04B 35/626* (2006.01)
*C04B 35/26* (2006.01)
*C01G 49/00* (2006.01)
*H01F 1/34* (2006.01)
*H01F 41/02* (2006.01)

(52) U.S. Cl.
CPC ............. *H01F 1/36* (2013.01); *C01G 49/0027* (2013.01); *C01G 49/0036* (2013.01); *C04B 35/26* (2013.01); *C04B 35/6261* (2013.01); *C04B 35/62675* (2013.01); *H01F 1/11* (2013.01); *H01F 1/344* (2013.01); *H01F 41/0266* (2013.01); *C01P 2004/03* (2013.01); *C01P 2004/51* (2013.01); *C01P 2004/62* (2013.01); *C01P 2006/12* (2013.01); *C01P 2006/42* (2013.01); *C04B 2235/3201* (2013.01); *C04B 2235/3213* (2013.01); *C04B 2235/3427* (2013.01); *C04B 2235/442* (2013.01); *C04B 2235/549* (2013.01); *C04B 2235/5409* (2013.01); *C04B 2235/5445* (2013.01); *C04B 2235/724* (2013.01); *C04B 2235/784* (2013.01); *C04B 2235/785* (2013.01); *Y10T 428/2982* (2015.01)

(58) Field of Classification Search
CPC .............. H01F 1/04; H01F 1/344; H01F 1/36; H01F 41/0266; C01G 49/0027; C01G 49/0036; C04B 35/6261; C04B 35/62675; C04B 35/36; C04B 2235/785; C04B 2235/442; C04B 2235/3201; C04B 2235/3213; C04B 2235/5409; C04B 2235/5445; C04B 2235/549; C04B 2235/724; Y10T 428/2982; C01P 2004/03; C01P 2004/51; C01P 2004/62; C01P 2004/12
USPC ........................ 428/402; 264/611; 423/594.2
See application file for complete search history.

(56) References Cited

U.S. PATENT DOCUMENTS

| 5,945,028 A * | 8/1999 | Taguchi ................. C04B 35/26 252/62.56 |
|---|---|---|
| 6,139,766 A | 10/2000 | Taguchi et al. |
| 2012/0105185 A1 | 5/2012 | Oda et al. |
| 2015/0332819 A1 | 11/2015 | Oda et al. |

FOREIGN PATENT DOCUMENTS

| EP | 2 819 128 | 12/2014 |
|---|---|---|
| JP | S34-9236 B | 10/1959 |
| JP | S52-126795 A | 10/1977 |
| JP | H02-145438 A | 6/1990 |
| JP | H10-265260 A | 10/1998 |
| JP | H11-154604 A | 6/1999 |
| JP | 2006-327883 | 12/2006 |

(Continued)

OTHER PUBLICATIONS

English-language translation of International Preliminary Report on Patentability (IPRP) dated Dec. 18, 2014 that issued in WO Patent Application No. PCT/JP2013/065890.

*Primary Examiner* — Leszek Kiliman
(74) *Attorney, Agent, or Firm* — Drinker Biddle & Reath LLP

(57) ABSTRACT

Provided is a method for producing Sr ferrite particles for sintered magnets, the method includes: a mixing step of mixing an iron compound, a strontium compound, and an alkali metal compound which includes at least one of K and Na as a constituent element and which does not include Cl and S as the constituent element to prepare a mixture; and a calcining step of firing the mixture at 850° C. to 1100° C. to obtain Sr ferrite particles in which an average particle size of primary particles is 0.2 to 1.0 µm. In the mixing step, the alkali metal compound is mixed in such a manner that a total amount of K and Na becomes 0.03 to 1.05% by mass in terms of $K_2O$ and $Na_2O$ with respect to a total amount of a powder of the iron compound and a powder of the strontium compound.

10 Claims, 14 Drawing Sheets

(56) References Cited

FOREIGN PATENT DOCUMENTS

| | | | |
|---|---|---|---|
| JP | 2006327883 | * | 12/2006 |
| JP | 207-031203 | | 2/2007 |
| JP | 2007-031204 | | 2/2007 |
| JP | 2007031203 | * | 2/2007 |
| WO | WO 2011/001831 | | 1/2011 |

* cited by examiner

1 μm

1 μm

1 μm

METHOD FOR MANUFACTURING SR FERRITE PARTICLE FOR SINTERED MAGNET, METHOD FOR USING SR FERRITE PARTICLE, SR FERRITE SINTERED MAGNET AND METHOD FOR MANUFACTURING SAME, AND MOTOR AND GENERATOR

TECHNICAL FIELD

The present invention relates to a method for producing Sr ferrite particles for a sintered magnet, a method for using the Sr ferrite particles, a Sr ferrite sintered magnet, a method for producing the Sr ferrite sintered magnet, a motor, and an a generator.

BACKGROUND ART

As magnetic materials that are used in a sintered ferrite magnet, Ba ferrite, Sr ferrite, and Ca ferrite which have a hexagonal crystal structure are known. Recently, among these magnetic materials, as a magnet material for motors and the like, magnetoplumbite type (M type) Sr ferrite has been mainly employed. The M type ferrite is expressed by, for example, General Formula of $AFe_{12}O_{19}$. The Sr ferrite has Sr at an A site of the crystal structure.

To improve magnetic characteristics of the sintered Sr ferrite magnet, improvement in the magnetic characteristics is attempted by substituting parts of an A-site element and a B-site element with a rare-earth element such as La, and Co, respectively. For example, Patent Literature 1 discloses a technology of improving a residual magnetic flux density (Br) and a coercive force (HcJ) by substituting parts of the A site and the B site with a specific amount of rare-earth element and Co.

The sintered Sr ferrite magnet is typically produced by using Sr ferrite particles. As a representative use of the sintered Sr ferrite magnet, a motor and a generator may be exemplified. The sintered Sr ferrite magnet that is used in the motor and the generator is demanded to be excellent in both characteristics of the Br and HcJ in combination with a high squareness ratio. However, generally, it is known that the Br and the HcJ are in a trade-off relationship. Therefore, it has been demanded to establish a technology capable of further improving both characteristics of the Br and the HcJ.

As an index indicating the magnetic characteristics in consideration of the both characteristics of the Br and the HcJ, a calculation expression of Br(kG)+⅓HcJ (kOe) is known (for example, refer to Patent Literature 1). As the value is high, it can be said that the sintered Sr ferrite magnet is suitable for a use such as the motor and the generator in which high magnetic characteristics are demanded.

CITATION LIST

Patent Literature

Patent Literature 1: Japanese Unexamined Patent Application Publication No. 11-154604

SUMMARY OF INVENTION

Technical Problem

As disclosed in Patent Literature 1, it is effective to improve the magnetic characteristics by controlling a composition of main crystal grains that constitute the sintered Sr ferrite magnet. However, it is difficult to greatly improve the magnetic characteristics of the sintered Sr ferrite magnet in the related art by controlling only the composition of crystal grains. As another means for improving the magnetic characteristics of the sintered Sr ferrite magnet, a configuration in which a structure is made fine is considered. As means for making the structure fine, a configuration in which Sr ferrite particles used as a raw material of the sintered Sr ferrite magnet are made fine is considered. As a method of making the Sr ferrite particles fine, a method of finely pulverizing the Sr ferrite particles in a mechanical manner, or a method of lengthening a pulverizing time is exemplified. However, when the Sr ferrite particles are finely pulverized in the mechanical manner as described above, there is a concern such as broadening of a particle size distribution, an increase in production cost due to an increase in power consumption, abrasion of a facility, and the like, and a decrease in a yield ratio.

As the sintered Sr ferrite magnet, currently, an anisotropic sintered Sr ferrite magnet, which is subjected to crystal orientation in a c-axis direction, is mainly used. In a case of producing the anisotropic sintered Sr ferrite magnet, it is necessary for a ferrite forming reaction to sufficiently progress in a calcining step so as to increase an orientation due to a magnetic field of ferrite particles at a step of manufacturing a molded body. Therefore, in the related art, calcination is performed at a high temperature of 1250° C. or higher. As a result, the energy cost in the calcining step increases, and the ferrite particles are subjected to grain growth to several μm to several tens of μm. It is difficult to uniformly make the ferrite particles fine, which are subjected to the grain growth as described above, to 1 μm or less so as to improve the magnetic characteristics of the sintered Sr ferrite magnet. In addition, there is a concern that the cost for pulverization of the Sr ferrite particles also increases.

Examples of a method of obtaining a fine Sr ferrite particle include a co-precipitation method, a flux method in which a flux is added, and the like. However, in a case of producing the Sr ferrite powders by the above-described method, troublesome operations such as a flux washing step and preparation of a solution are necessary. Accordingly, a process becomes complicated, and the production cost increases. In consideration of these situations, it is demanded to establish a production method capable of producing the sintered Sr ferrite magnet having high magnetic characteristics by a simple step and with a low production cost. In addition, it is demanded to establish a production method capable of producing Sr ferrite particles suitable for producing of the sintered Sr ferrite magnet having high magnetic characteristics by a simple process and with a low production cost.

However, the sintered Sr ferrite magnet is frequently used in motors and generators. Accordingly, the sintered Sr ferrite magnet is demanded to be excellent in reliability to avoid a situation in which the sintered Sr ferrite magnet is broken or peeled off and falls down during use of the motors or the generators, thereby breaking the motors or the generators.

The invention has been made in consideration of the above-described circumstances, and an object thereof is to provide a method for producing a sintered Sr ferrite magnet which is capable of producing the sintered Sr ferrite magnet having excellent magnetic characteristics and high reliability with a simple process. In addition, another object of the invention is to provide a method for producing Sr ferrite particles suitable for producing of the sintered Sr ferrite magnet, and a method for using the Sr ferrite particles. In addition, still another object of the invention is to provide a sintered Sr ferrite magnet having excellent magnetic characteristics and high reliability. In addition, still another object of the invention is to provide a motor and a generator which have high efficiency and high reliability.

Solution to Problem

The present inventor has examined various methods of producing a fine pulverized powder containing Sr ferrite to make a structure of a sintered ferrite magnet fine. As a result, it was founded that a temperature at which the Sr ferrite is generated can be greatly lowered when an alkali metal compound which includes K and/or Na as a constituent element and which does not include Cl and S as the constituent element is added. In addition, when using Sr ferrite particles (calcined bodies) which are obtained with firing at a low temperature, the production cost is reduced, and the magnetic characteristics and the reliability of the sintered Sr ferrite magnet can be improved, so that the present inventor has accomplished the invention.

That is, according to one aspect of the invention, there is provided a method for producing Sr ferrite particles for sintered magnets, the method includes: a mixing step of mixing an iron compound, a strontium compound, and an alkali metal compound which includes at least one kind of element selected from K and Na as a constituent element and which does not include Cl and S as the constituent element to prepare a mixture; and a calcining step of firing the mixture at 850° C. to 1100° C. to obtain Sr ferrite particles in which an average particle size of primary particles is 0.2 μm to 1.0 μm, wherein in the mixing step, the alkali metal compound is mixed in such a manner that a total amount of K and Na is 0.03 to 1.05% by mass in terms of $K_2O$ and $Na_2O$ with respect to a total amount of a powder of the iron compound and a powder of the strontium compound.

According to the producing method of the invention, it is possible to produce Sr ferrite particles which are sufficiently fine and which have high magnetic characteristics with a simple process. The Sr ferrite particles can be suitably used to produce a sintered Sr ferrite magnet which has high reliability while maintaining all characteristics including a squareness ratio (Hk/HcJ), a residual magnetic flux density (Br), and a coercive force (HcJ) to be high.

The reason for obtaining these effects is assumed as follows. That is, in the producing method of the invention, a mixture, which contains a predetermined amount of alkali metal compound which includes K (potassium) and/or Na (sodium) as a constituent element and which does not include Cl (chlorine) and S (sulfur) as the constituent element, is used as a raw material. According to this, even when a firing temperature during calcination is set to 850° C. to 1100° C., it is possible to sufficiently generate Sr ferrite. As described above, since the firing temperature during the calcination can be set to be low, it is possible to obtain Sr ferrite particles which are appropriately fine and which are excellent in sinterability. When the Sr ferrite particles are used, it is possible to produce a sintered Sr ferrite magnet in which crystal grains are fine and are excellent in uniformity. In addition, it is possible to produce a sintered Sr ferrite magnet in which precipitation of foreign matter to a surface of the sintered Sr ferrite magnet is sufficiently suppressed, and which is excellent in reliability.

The reason for the generation of Sr ferrite at a low firing temperature as described above is considered as follows. The potassium and/or sodium components which are contained in a mixture promote generation of the Sr ferrite. Accordingly, the Sr ferrite particles, which are obtained by the producing method of the invention, have high magnetic characteristics. Furthermore, the Sr ferrite particles, which are obtained by the producing method of the invention, are fine and have high uniformity in consideration of a shape and a size thereof, thereby having excellent sinterability. Accordingly, when the Sr ferrite particles, which are obtained by the producing method of the invention, are used to produce a sintered Sr ferrite magnet, it is possible to produce the sintered Sr ferrite magnet, which is excellent in reliability and has high magnetic characteristics, with a simple process.

When the alkali metal compound includes Cl as a constituent element, an effect of promoting generation of Sr ferrite is not obtained, and thus when the calcining step is performed at 850° C. to 1100° C., it is difficult to obtain Sr ferrite particles having high magnetic characteristics. The reason for this is considered that $SrCl_2$ generated by a reaction between Cl and Sr is stable and has a high decomposition temperature. It is considered that generation of the stable compound hinders a ferrite forming reaction. In addition, for example, a chloride itself of an alkali metal such as NaCl is a stable compound, and vaporizes during a calcining step and tends to scatter. Therefore, it is considered that it is difficult to obtain the effect of promoting generation of Sr ferrite.

In addition, even when the alkali metal compound include S as a constituent element, as is the case with Cl, it is difficult to obtain the effect of promoting the Sr ferrite. As is the case with Cl, the reason for this is considered due to generation of a stable compound such as $SrSO_4$. That is, the alkali metal compound in the invention is a compound other than compounds including Cl and/or S as a constituent element.

A saturation magnetization of the Sr ferrite particles that are obtained in the calcining step may be 67 emu/g or more. In the Sr ferrite particles, a ratio of a Sr ferrite phase is sufficiently high, and thus the Sr ferrite particles can be more suitably used to produce the sintered Sr ferrite magnet having the high magnetic characteristics.

The alkali metal compound may contain at least one kind of compound selected from carbonate and silicate. These salts are decompressed at a low temperature and carry out a reaction, and thus it is possible to obtain Sr ferrite particles having further higher magnetic characteristics. In addition, it is possible to further lower a firing temperature during producing the Sr ferrite particles. According to this, a structure of the sintered Sr ferrite magnet becomes further finer, and thus it is possible to further improve reliability of the magnetic characteristics.

An amount of chlorine in the Sr ferrite particles may be 0.05% by mass or less. According to this, it is possible to obtain Sr ferrite particles having further higher magnetic characteristics.

The method for producing the Sr ferrite particles for sintered magnets of the invention may further include a rough pulverizing step of dry-pulverizing the Sr ferrite particles. According to this, it is possible to further improve the sinterability of the Sr ferrite particles. However, when the Sr ferrite particles, which are obtained in the calcining step, are formed as fine granules, the rough pulverizing step can be omitted.

For example, a specific surface area of the Sr ferrite particles that are obtained in the calcining step may be 1.5 to 10 $m^2/g$, and more preferably 2 to 10 $m^2/g$. According to this, it is possible to further improve uniformity of crystal grains of the Sr ferrite in the sintered Sr ferrite magnet that is obtained without deteriorating moldability. Accordingly, it is possible to further increase the magnetic characteristics and the reliability of the sintered Sr ferrite magnet.

The iron compound may be an iron oxide that is produced according to a spray firing method. The iron oxide that is produced by the spray firing method typically contains Cl in an amount of several hundreds of ppm to several thousands of ppm. In the invention, since a predetermined amount of alkali metal compound is mixed, and thus choline that is contained in the iron oxide is bonded to the alkali metal and generates a chloride such as NaCl. The chloride tends to scatter during the calcining step, and thus it is possible to remove Cl that hinders the ferrite forming reaction.

According to another aspect of the invention, there is provided a method for producing a sintered Sr ferrite magnet by using the Sr ferrite particles that are obtained by the above-described method of producing the Sr ferrite particles.

According to the invention, for example, there is provided a method for producing a sintered Sr ferrite magnet, the method includes: a fine pulverizing step of wet-pulverizing the Sr ferrite particles which are obtained by the above-described producing method; a molding step of wet-molding the Sr ferrite particles that are wet-pulverized to prepare a molded body; and a sintering step of firing the molded body at 1000° C. to 1250° C. to obtain a sintered magnet.

According to the above-described method for producing the sintered Sr ferrite magnet, it is possible to produce the sintered Sr ferrite magnet, which has high reliability while maintaining all characteristics including the squareness ratio (Hk/HcJ), the residual magnetic flux density (Br), and the coercive force (HcJ) to be high, with a simple process. The reason for obtaining these effects is assumed as follows. That is, in the above-described producing method, the Sr ferrite particles, which are produced by using a mixture containing a predetermined amount of K (potassium) and/or Na (sodium), are used as a raw material. According to this, even when a firing temperature during calcination is set to 850° C. to 1100° C., it is possible to sufficiently generate Sr ferrite. As described above, since the firing temperature during the calcination is sufficiently low, it is possible to obtain Sr ferrite particles which are fine and have high uniformity in consideration of a shape and a size thereof, thereby having excellent sinterability. When the Sr ferrite particles are used, it is possible to produce a sintered Sr ferrite magnet in which crystal grains are fine and are excellent in uniformity. In addition, it is possible to produce a sintered Sr ferrite magnet in which precipitation of foreign matter derived from an excessive alkali metal compound to a surface of a sintered magnet is sufficiently suppressed, and which is excellent in reliability.

In the sintered Sr ferrite magnet that is produced by the invention, Sr ferrite crystal grains are fine and have excellent uniformity, and thus the sintered Sr ferrite magnet has high magnetic characteristics and is excellent in reliability. In the method of producing the sintered Sr ferrite magnet of the invention, it is possible to produce the sintered Sr ferrite magnet with a simple process without performing a complicated operation in a manner different from a co-precipitation method and a flux method. That is, it can be said that the method for producing the sintered Sr ferrite magnet of the invention is a method suitable for mass production of the sintered Sr ferrite magnet.

In the sintered Sr ferrite magnet that is obtained by the producing method of the invention, for example, an average grain size of crystal grains of Sr ferrite may be 0.6 μm or less, and a ratio of crystal grains, which have a grain size of 1.8 μm or more, on the number basis may be 1% or less. As described above, the sintered Sr ferrite magnet which is fine and has high uniformity is more excellent in reliability and can exhibit high magnetic characteristics in a stable manner.

The sintered Sr ferrite magnet that is obtained by the producing method of the invention may satisfy the following Expression (1). According to this, it is possible to realize a sintered Sr ferrite magnet in which the residual magnetic flux density (Br) and the coercive force (HcJ) are compatible at a further higher level. In addition, in the sintered Sr ferrite magnet that is obtained by the producing method of the invention, the squareness ratio is 80% or more while the following expression (1) is satisfied.

$$Br + \tfrac{1}{3} HcJ \geq 5.5 \qquad (1)$$

[In Expression (1), Br and HcJ represent a residual magnetic flux density (kG) and a coercive force (kOe), respectively.]

According to still another aspect of the invention, there is provided a sintered Sr ferrite magnet containing Sr ferrite having a hexagonal structure, and an alkali metal compound which includes at least one kind of element selected from K and Na. A total amount of K and Na is 0.17% by mass or less in terms of $K_2O$ and $Na_2O$, an average grain size of Sr ferrite crystal grains is 0.6 μm or less, and a ratio of crystal grains, which have a grain size of 1.8 μm or more, on the number basis is 1% or less.

The sintered Sr ferrite magnet of the invention has a structure which is sufficiently fine and has high uniformity. The sintered Sr ferrite magnet is excellent in all characteristics including the squareness ratio (Hk/HcJ), the residual magnetic flux density (Br), and the coercive force (HcJ). In addition, precipitation of foreign matter to a surface of the sintered Sr ferrite magnet is suppressed, and thus the sintered Sr ferrite magnet has high reliability. A motor and a generator which include the sintered Sr ferrite magnet have sufficiently high efficiency.

According to still another aspect of the invention, there is provided a motor including the above-described sintered Sr ferrite magnet. The sintered Sr ferrite magnet may be a magnet that is obtained according to the above-described method of manicuring the sintered Sr ferrite magnet. Since the motor of the invention include the sintered Sr ferrite magnet which is excellent in both characteristics of the residual magnetic flux density (Br) and the coercive force (HcJ), and which has high reliability, the motor of the invention has both of high efficiency and high reliability.

According to still another aspect of the invention, there is provided a generator including the above described sintered Sr ferrite magnet. The sintered Sr ferrite magnet may be a magnet that is obtained according to the above-described method of manicuring the sintered Sr ferrite magnet. Since the generator of the invention include the sintered Sr ferrite magnet which is excellent in both characteristics of the residual magnetic flux density (Br) and the coercive force (HcJ), and which has high reliability, the generator of the invention has both of high efficiency and high reliability.

According to still another aspect of the invention, there is provided a method for using the Sr ferrite particles. In the using method, the Sr ferrite particles, which are obtained by the above-described method for producing the Sr ferrite particles, are used to produce a sintered Sr ferrite magnet. In the using method, since the Sr ferrite particles, which have high magnetic characteristics and are excellent in sinterability, are used to produce the sintered Sr ferrite magnet, it is possible to produce the sintered Sr ferrite magnet, which has high reliability while maintaining all characteristics including the squareness ratio (Hk/HcJ), the residual magnetic flux density (Br), and the coercive force (HcJ) to be high, with a simple process.

Advantageous Effects of Invention

According to the invention, it is possible to produce a sintered Sr ferrite magnet which has excellent magnetic characteristics and high reliability with a simple process and a low production cost. In addition, it is possible to provide a method of producing Sr ferrite particles suitable for producing of the sintered Sr ferrite magnet, and a method of using the Sr ferrite particles. In addition, it is possible to provide a sintered Sr ferrite magnet having excellent magnetic characteristics and high reliability. In addition, it is possible to provide a motor and a generator which have high efficiency and high reliability.

DESCRIPTION OF EMBODIMENTS

Hereinafter, a preferred embodiment of invention will be described in detail with reference to the attached drawings as necessary.

Figure 1:
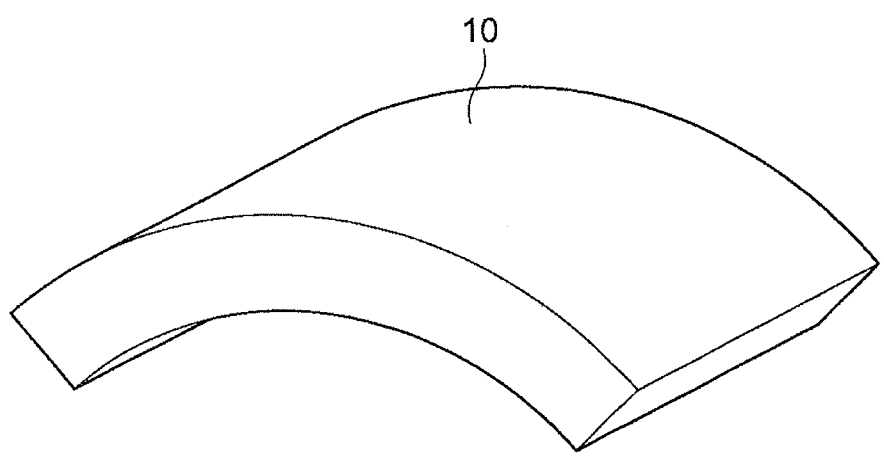
FIG. 1 is a perspective view schematically illustrates a preferred embodiment of a sintered Sr ferrite magnet of the invention.

FIG. 1 is a perspective view schematically illustrating a sintered Sr ferrite magnet of this embodiment. An anisotropic sintered Sr ferrite magnet 10 has a curved shape in which a cross-section has an arc shape. Generally, the sintered Sr ferrite magnet 10 has a shape called an arc segment shape, a C shape, a roof tile shape, or a bow shape. For example, the sintered Sr ferrite magnet 10 is suitably used as a magnet for motors and generators.

The sintered Sr ferrite magnet 10 contains crystal grains of M-type Sr ferrite having a hexagonal structure as a main component. For example, the Sr ferrite is expressed by the following Formula (2).

$$SrFe_{12}O_{19} \qquad (2)$$

In the Sr ferrite of Formula (2), parts of A-site Sr and B-site Fe may be substituted with an impurity or an intentionally added element. In addition, a ratio between the A site and the B site may slightly deviate. In this case, the Sr ferrite may be expressed, for example, by the following General Formula (3).

$$R_xSr_{1-x}(Fe_{12-y}M_y)_zO_{19} \qquad (3)$$

In General Formula (3), for example, x and y range from 0.1 to 0.5, and z ranges from 0.7 to 1.2.

For example, M in General Formula (3) represents one or more kinds of elements selected from the group consisting of Co (cobalt), Zn (zinc), Ni (nickel), Mn (manganese), Al (aluminum), and Cr (chromium). In addition, for example, R in General Formula (3) represents one or more kinds of elements selected from the group consisting of La (lanthanum), Ce (cerium), Pr (praseodymium), Nd (neodymium), and Sm (samarium).

A mass ratio of a Sr ferrite phase in the sintered Sr ferrite magnet 10 is preferably 90% by mass or more, more preferably 95% by mass or more, and still more preferably 97% by mass or more. As described above, it is possible to further increase the magnetic characteristics by reducing the mass ratio of a crystal phase different from the Sr ferrite phase. When a theoretical value of a saturation magnetization of the Sr ferrite is set as $\sigma_t$ and a measured value is set as $\sigma_s$, the ratio (%) of the Sr ferrite phase in the sintered Sr ferrite magnet 10 can be obtained a calculation expression of $(\sigma_s/\sigma_t) \times 100$.

As an accessory component, the sintered Sr ferrite magnet 10 contains a component different from the Sr ferrite. Examples of the accessory component include an alkali metal compound including K (potassium) and/or Na (sodium) as a constituent element. Examples of the alkali metal compound include oxides such as $Na_2O$ and $K_2O$, or silicate glass. The total amount of alkali metal oxides in the sintered Sr ferrite magnet 10 is 0.17% by mass or less by mass in terms of $Na_2O$ and $K_2O$.

When the total amount of Na and K exceeds 0.17% by mass, a white powder tends to occur on a surface of the sintered Sr ferrite magnet 10. When the white powder occurs on the surface of the sintered Sr ferrite magnet 10, for example, adhesion between a member of a motor or a generator and the sintered Sr ferrite magnet 10 decreases, and thus the sintered Sr ferrite magnet 10 may be peeled from the member of the motor or the generator. That is, reliability of the sintered Sr ferrite magnet 10 deteriorates.

The upper limit of the total amount of Na and K in the sintered Sr ferrite magnet 10 is preferably 0.12% by mass in terms of $Na_2O$ and $K_2O$ from the viewpoint of further improving reliability of the sintered Sr ferrite magnet, more preferably 0.1% by mass, and still more preferably 0.08% by mass. The lower limit of the total amount of Na and K is preferably 0.01% by mass in terms of $Na_2O$ and $K_2O$ from the viewpoint of further reducing the production cost, more preferably 0.02% by mass, and still more preferably 0.03% by mass. To reduce the total amount of Na and K, it is necessary to perform an operation of washing a finely pulverized powder. Accordingly, when the total amount of Na and K is set to be less than the lower limit, the production cost may increase.

As the accessory component, the sintered Sr ferrite magnet 10 may further contain an arbitrary component other than the above-described alkali metal compound. Examples of the arbitrary component include oxides and composite oxide which include at least one kind of element selected from the group consisting of Si (silicon), Ca (calcium), Sr (strontium), and Ba (barium). Examples of the oxides include $SiO_2$, CaO, SrO, and BaO.

For example, an amount of Si in the sintered Sr ferrite magnet 10 is 0.1 to 1.0% by mass in terms of $SiO_2$. For example, an amount of Sr in the sintered Sr ferrite magnet 10 is 10 to 13% by mass in terms of SrO. The sintered Sr ferrite magnet 10 may contain Ba. For example, an amount of Ba in the sintered Sr ferrite magnet 10 is 0.01 to 2.0% by mass in terms of BaO. For example, an amount of Ca in the sintered Sr ferrite magnet 10 is 0.05 to 2% by mass in terms of CaO. In addition to the components, impurities that are included in raw materials or unavoidable components that are derived from a producing facility may be included in the sintered ferrite magnet 10. Examples of these components include oxides of Ti (titanium), Cr (chromium), Mn (manganese), Mo (molybdenum), V (vanadium), Al (aluminum), and the like.

The accessory component is mainly included in a grain boundary of crystal grains of the Sr ferrite in the sintered Sr ferrite magnet 10. The amount of respective components of the sintered Sr ferrite magnet 10 can be measured by fluorescent X-ray analysis and inductively coupled plasma emission spectroscopic analysis (ICP analysis).

An average grain size of crystal grains of the Sr ferrite in the sintered Sr ferrite magnet 10 is 0.6 μm or less, and preferably 0.59 μm or less. When the average grain size of crystal grains of the Sr ferrite exceeds 0.6 μm, there is a tendency that it is difficult to obtain sufficiently excellent magnetic characteristics. On the other hand, there is a tendency that mass production of a sintered Sr ferrite magnet in which an average grain size of crystal grains of the Sr ferrite is less than 0.3 μm is difficult.

It is preferable that a variation in the grain size of crystal grains of the Sr ferrite included in the sintered Sr ferrite magnet 10 be small. As described above, when uniformity of crystal grains of the Sr ferrite is improved, it is possible to increase the reliability while further increasing the magnetic characteristics. From this viewpoint, in the sintered Sr ferrite magnet 10, a ratio of crystal grains of the Sr ferrite, which have the grain size of 1.8 μm or more, on the number basis with respect to the entirety of crystal grains of the Sr ferrite is preferably 1% or less, more preferably 0.8% or less, and still more preferably 0.66% or less.

The grain size of crystal grains of the Sr ferrite in the sintered Sr ferrite magnet 10 can be measured in the following sequence. A sample, which is cut from the sintered Sr ferrite magnet, is made to be thin, and the sample is observed with a TEM. Alternatively, a cross-section of the sample is mirror-polished and is etched with an acid such as hydrofluoric acid, then, the resultant etched surface is observed with the SEM. In a SEM or TEM observation image including several hundreds of crystal grains, a contour of crystal grains is made to be clear, and image processing and the like are performed. Then, a grain size distribution of a c-plane is measured. "Grain size" in this specification represents the major axis (diameter in an a-axis direction) in an a-plane. The major axis is obtained as the longest side of a "rectangle with the smallest area" which circumscribes each of the crystal grains. In addition, a ratio of the longest side to the shortest side in the "rectangular with the smallest area" is an "aspect ratio". In addition, a so-called thermal etching in which a sample is heated and etched may be performed instead of the etching with the acid.

From the measured grain size distribution on the number basis, an average value of the grain size of crystal grains on the number basis is calculated. In addition, a standard deviation is calculated from the grain size distribution and the average value which are measured. In this specification, the grain size distribution and the average value are set as an average grain size of crystal grains of the Sr ferrite and a standard deviation thereof. From the viewpoint of obtaining the sintered Sr ferrite magnet 10 having sufficiently high magnetic characteristics, it is preferable that a number average value (average aspect ratio) of the aspect ratio of respective crystal grains be approximately 1.7.

It is preferable that the sintered Sr ferrite magnet 10 satisfy the following Expression (1). Crystal grains of the Sr ferrite in the sintered Sr ferrite magnet of this embodiment are sufficiently fine, and thus high magnetic characteristics which satisfy Expression (1) are obtained. A sintered Sr ferrite magnet, which satisfies Expression (1), has sufficiently excellent magnetic characteristics. It is possible to provide a motor and a generator which have further higher efficiency due to the sintered Sr ferrite magnet. In addition, it is preferable that the sintered Sr ferrite magnet 10 satisfies the following Expression (4). According to this, the magnetic characteristics of the sintered Sr ferrite magnet 10 become higher, and thus it is possible to provide a motor and a generator which have further higher efficiency.

$$Br+\tfrac{1}{3}HcJ \geq 5.5 \tag{1}$$

$$Br+\tfrac{1}{3}HcJ \geq 5.6 \tag{4}$$

In Expression (1) and Expression (4), Br and HcJ represent a residual magnetic flux density (kG) and a coercive force (kOe), respectively.

It is preferable squareness ratio of the sintered Sr ferrite magnet 10 be 80% or more, and more preferably 90% or more. When having the excellent magnetic characteristics, the sintered Sr ferrite magnet can be further suitably used in motors or generators.

For example, the sintered Sr ferrite magnet 10 may be used as a magnet of motors for vehicles such as motors for a fuel pump, a power window, an anti-lock brake system (ABS), a fan, a wiper, power steering, an active suspension, a starter, a door lock, and an electric mirror. In addition, the sintered Sr ferrite magnet 10 may also be used as a magnet of motors for OA/AV apparatuses such as motors for an FDD spindle, a VTR capstan, a VTR rotary head, a VTR reel, VTR loading, a VTR camera capstan, a VTR camera rotary head, VTR camera zooming, VTR camera focusing, a radio cassette recorder capstan, a CD/DVD/MD spindle, CD/DVD/MD loading, and CD/DVD optical pickup. Furthermore, the Sr sintered ferrite magnet 10 may also be used as a magnet of motors for household electrical appliances such as motors for a compressor of an air-conditioner, a compressor of a freezer, electric tool driving, a dryer fan, electric shaver driving, and an electric toothbrush. Furthermore, the sintered Sr ferrite magnet 10 may also be used as a magnet of motors for FA apparatuses such as motors for driving of a robot shaft and a joint, main driving of a robot, driving of a machine tool table, and driving of a machine tool belt.

The sintered Sr ferrite magnet 10 is bonded to a member of the above-described motor and is provided inside the motor. In the sintered Sr ferrite magnet 10 having excellent magnetic characteristics, generation of a crack is sufficiently suppressed, and thus the sintered Sr ferrite magnet 10 is bonded to the member of the motor in a sufficiently strong manner. As described above, it is possible to sufficiently suppress the sintered Sr ferrite magnet 10 from being peeled from the member of the motor. Accordingly, various motors provided with the sintered. Sr ferrite magnet 10 have both of high efficiency and high reliability.

Figure 2:
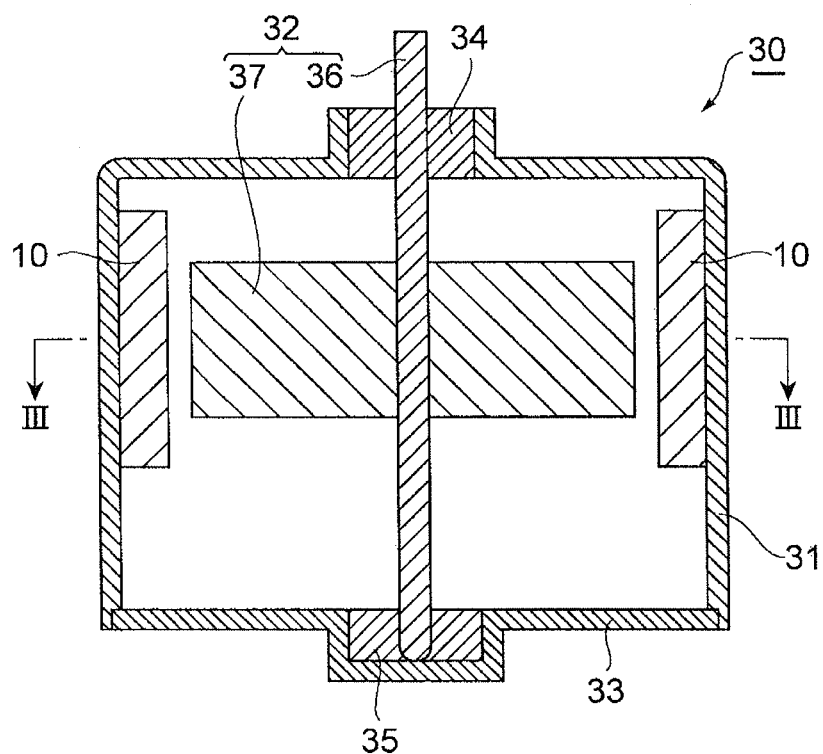
FIG. 2 is a cross-sectional view schematically illustrating a preferred embodiment of a motor of the invention.

FIG. 2 is a cross-sectional view schematically illustrating an embodiment of a motor 30 provided with the sintered Sr ferrite magnet 10. The motor 30 of this embodiment is a brush-attached DC motor, and includes a bottomed cylindrical housing 31 (stator) and a rotatable rotor 32 that is concentrically disposed on an inner circumference side of the housing 31. The rotor 32 includes a rotor shaft 36 and a rotor core 37 that is fixed to the rotor shaft 36. A bracket 33 is inserted into an opening of the housing 31, and the rotor core is accommodated in a space formed by the housing 31 and the bracket 33. The rotor shaft 36 is rotatably supported to bearings 34 and 35, which are respectively provided to the center of the housing 31 and the center of the bracket 33, to face each other. Two c-shaped sintered Sr ferrite magnets 10 are fixed to an inner circumferential surface of a tubular portion of the housing 31 to face each other.

Figure 3:
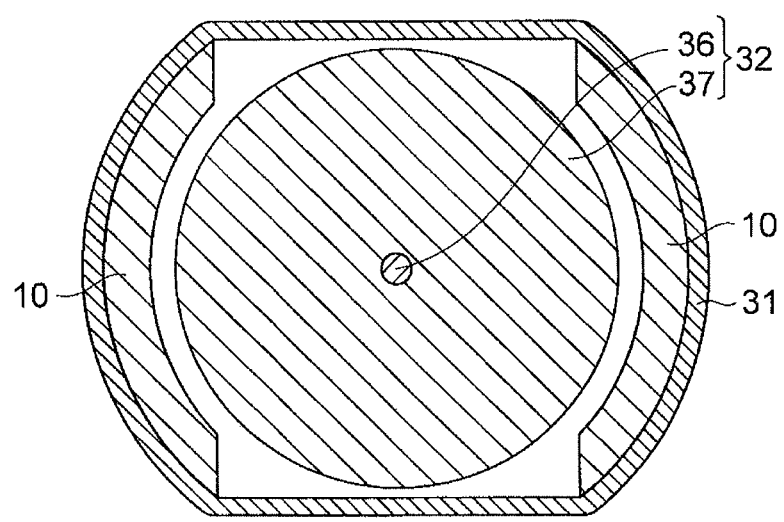
FIG. 3 is a cross-sectional view taken along line of the motor shown in FIG. 2.

FIG. 3 is a cross-sectional view taken along line of the motor 30 shown in FIG. 2. An outer circumferential surface of the magnet 10 for a motor is set as a bonding surface, and the magnet 10 for a motor is bonded to the inner circumferential surface of the housing 31 with an adhesive. Precipitation of foreign matter such as a powder to the surface of the sintered Sr ferrite magnet 10 is sufficiently suppressed, and thus adhesiveness between the housing 31 and the sintered Sr ferrite magnet 10 is satisfactory. Accordingly, the motor 30 has excellent reliability in combination with excellent characteristics.

The use of the sintered Sr ferrite magnet 10 is not limited to the motor, and the sintered Sr ferrite magnet 10 may be used as a member of, for example, a generator, a magnet for speakers and headphones, a magnetron tube, a magnetic field generating apparatus for an MRI, a clamper for a CD-ROM, a sensor for a distributor, a sensor for an ABS, a fuel and oil level sensor, a magnet latch, an isolator, and the like. In addition, the sintered Sr ferrite magnet 10 may be used as a target (pellet) during formation of a magnetic layer of a magnetic recording medium by a deposition method, a sputtering method, and the like. The sintered Sr ferrite magnet 10 can be produced according to the following producing method.

A preferred embodiment of a method for producing the sintered Sr ferrite magnet and a method for producing Sr ferrite particles will be described. The method for producing the sintered Sr ferrite magnet of this embodiment includes a mixing step of mixing a powder of the iron compound, a powder of the strontium compound, and a powder of the alkali metal compound which includes at least one kind of element selected from potassium and sodium as a constituent element to prepare a mixture, a calcining step of firing the mixture at 850° C. to 1100° C. to obtain a calcined body formed from Sr ferrite particles having a hexagonal structure, a pulverizing step of pulverizing the calcined body formed from the Sr ferrite particles to obtain a pulverized powder, a molding step of molding the pulverized powder in a magnetic field to obtain a molded body, and a sintering step of firing the molded body at 1000° C. to 1250° C. to obtain a sintered Sr ferrite magnet.

On the other hand, the method for producing the Sr ferrite particles of this embodiment includes the above-described mixing step and the above-described calcining step. In addition, the above-described pulverizing step may be included according to circumstances. As described above, the mixing step, the calcining step, and the pulverizing step in the method for producing the sintered Sr ferrite magnet and the method for producing the Sr ferrite particles may be common to the methods, and thus a description thereof will be collectively given in the following description.

The mixing step is a step of preparing a mixture for calcination. In the mixing step, first, starting raw materials are weighed and are blended in a predetermined ratio, and are mixed with a wet-type attritor, a ball mill, and the like for 1 hour to 20 hours. Pulverization is performed during the mixing. Examples of the starting raw materials, a powder of the iron compound, a powder of the strontium compound, and the alkali metal compound which includes at least one kind element selected from potassium and sodium as a constituent element and which does not include chlorine and sulfur as the constituent element. The alkali metal compound may be a powdered compound or a liquid compound. In this embodiment, since the alkali metal compound is used, even when the iron compound is prepared by a spray firing method, Cl can be sufficiently reduced, and thus it is possible to promote a ferrite forming reaction. It is preferable that an amount of Cl of the iron compound be 1000 ppm by mass or less.

As the iron compound and the strontium compound, compounds such as oxides, and carbonates, hydroxides, nitrides, and the like which become oxides by firing may be used. Examples of the compounds include $SrCO_3$, $Fe_2O_3$, and the like. In addition to the components, $La(OH)_3$, $Co_3O_4$, and the like may be added. Examples of the alkali metal compound include carbonates, silicates, and organic compounds (dispersing agents) containing Na and/or K. The silicates of the alkali metal may be orthosilicates, metasilicates, water glass, and the like, and these may be powders or liquids. Examples of the organic compounds include salts of sodium and potassium. Specifically, a sodium salt of an aliphatic acid, a potassium salt of the aliphatic acid, a sodium salt of polycarboxylic acid, a potassium salt of the polycarboxylic acid, and the like.

In the mixing step, the alkali metal compound is mixed in such a manner that a total amount of K and Na becomes 0.03 to 1.05% by mass in terms of $K_2O$ and $Na_2O$ with respect to the total amount of the iron compound and the strontium compound, and preferably 0.1 to 1.0% by mass. The lower limit of the numerical range of the total amount of K and Na is preferably 0.1% by mass from the viewpoint of further reducing a firing temperature when obtaining the Sr ferrite particles and the sintered Sr ferrite magnet, more preferably 0.2% by mass, and still more preferably 0.3% by mass. The upper limit of the numerical range of the total amount of K and Na is preferably 1.0% by mass from the viewpoint of further increasing the magnetic characteristics of the sintered Sr ferrite magnet, more preferably 0.8% by mass, and still more preferably 0.6% by mass.

In the mixing step, in addition to the above-described alkali metal compound, other accessory components may be added. Examples of the accessory components include $SiO_2$, $CaCO_3$, and the like. For example, an average particle size of the starting raw materials is not particularly limited, and for example, the particle size is 0.1 μm to 2.0 μm. The specific surface area of the starting raw materials according to the BET method is preferably 2 m²/g or more. According to this, it is possible to obtain a further finer pulverized powder. The mixture that is prepared in the mixing step may be a powdered mixture or slurry in which a mixed powder is dispersed in a solvent.

The calcining step is a step of calcining the mixture that is obtained in the mixing step. The calcination can be performed in an oxidizing atmosphere such as the air. A firing temperature in the calcining step is 850° C. to 1100° C., preferably 850° C. to 1000° C., and more preferably 900° C. to 1000° C. A calcination time at the calcination temperature is preferably 0.1 hours to 5 hours, and more preferably 0.5 hours to 3 hours. An amount of Sr ferrite in the Sr ferrite particles that are obtained after the calcination is preferably 70% by mass or more, and more preferably 90% by mass or more. In the producing method of this embodiment, since the alkali metal compound is added in a predetermined amount before the calcining step, it is possible to sufficiently generate the Sr ferrite having a hexagonal structure even at the above-described calcination temperature.

Figure 4:
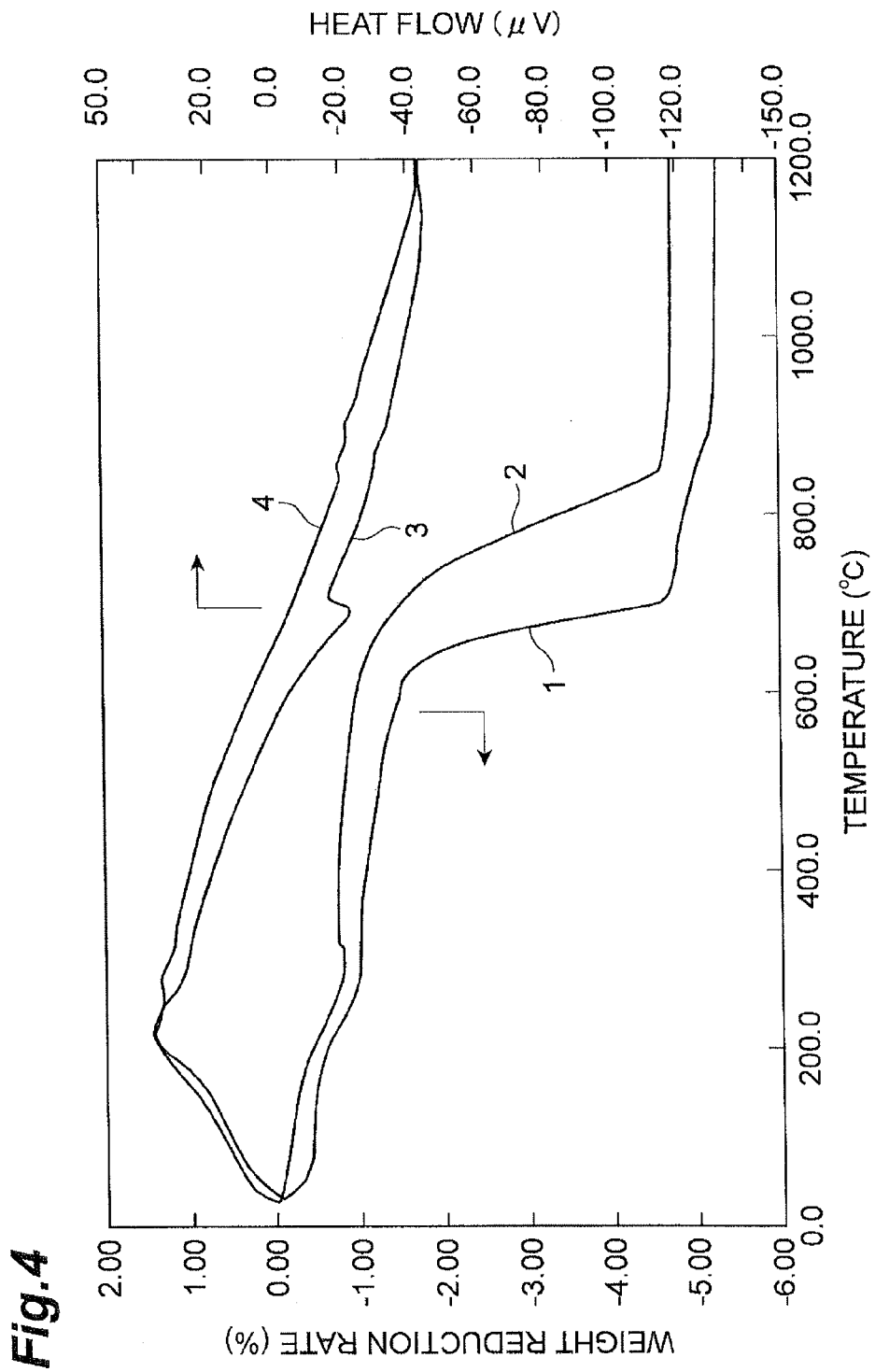
FIG. 4 is a graph illustrating the behavior of weight reduction and a heat flow when a raw material powder of the sintered Sr ferrite magnet is heated.

FIG. 4 is a graph illustrating the behavior of weight reduction and a heat flow when a raw material powder of the sintered Sr ferrite magnet is heated. Curve 1 in FIG. 4 represents a weight reduction rate when 220 g of iron compound ($Fe_2O_3$) powder, 35.23 g strontium compound ($SrCO_3$) powder, 1.73 g of alkali metal compound (sodium orthosilicate) powder, and 2.23 g of sorbitol are blended, and a temperature is raised in a rate of 10° C./minute. Curve 2 in FIG. 4 represents the weight reduction rate when a temperature is raised in the same manner as Curve 1 except that the alkali metal compound is not blended. Curve 3 and Curve 4 in FIG. 4 represent heat flow measurement values which correspond to Curve 1 and Curve 2, respectively.

From comparison between Curve 1 and Curve 2 in FIG. 4, it can be seen that in a sample in which the alkali metal compound is blended, decomposition of the raw material powder occurs at a lower temperature in comparison to a sample in which the alkali metal compound is not blended. That is, when the alkali metal compound is blended, it is considered that a decomposition reaction of the strontium compound is promoted in the calcining step. This is considered as one cause of sufficient generation of the Sr ferrite having a hexagonal structure even at a low temperature.

The saturation magnetization of the Sr ferrite particles is preferably 67 emu/g or more, more preferably 70 emu/g or more, and still more preferably 70.5 emu/g or more. When the Sr ferrite particles having the high saturation magnetization as described above are generated, it is possible to obtain a sintered Sr ferrite magnet having further higher magnetic characteristics. The saturation magnetization in this specification can be measured by using a vibration sample type magnetometer (VSM) that is commercially available.

For example, an amount of chlorine (Cl) in the Sr ferrite particles is 0.05% by mass or less, and in other embodiments, the amount of chlorine may be 0.036% by mass or less. In addition, the amount of chlorine in this specification can be measured by fluorescent X-ray analysis.

A specific surface area of the Sr ferrite particles, which are obtained in the calcining step, according to a BET method is 2 m²/g or more from the viewpoint of making a structure of the finally obtained sintered Sr ferrite magnet sufficiently fine, preferably 2.5 m²/g or more, and more preferably 2.7 m²/g or more. In addition, the specific surface area of the Sr ferrite particle according to the BET method is 15 m²/g or less from the viewpoint of obtaining satisfactory moldability during preparation of the molded body, preferably 10 m²/g or less, and more preferably 7 m²/g or less. In addition, the specific area in this specification can be measured by using a BET specific area measuring device (trade name: HM Model-1210, manufactured by Mountech Co., Ltd.) that is commercially available.

An average particle size of primary particles of the Sr ferrite particles that are obtained in the calcining step is 1.0 μm or less from the viewpoint of making a structure of a finally obtained sintered Sr ferrite magnet sufficiently fine while obtaining satisfactory sinterability, preferably 0.8 μm or less, more preferably 0.7 μm or less, and still more preferably 0.6 μm or less. In addition, the average particle size of the primary particles of the Sr ferrite particles is 0.1 μm or more from the viewpoint of obtaining satisfactory moldability during producing of a molded body, preferably 0.2 μm or more, and more preferably 0.3 μm or more. In addition, the average particle size of the primary particles in this specification can be obtained by using an observation image with a TEM or a SEM. Specifically, image processing is performed with respect to a SEM or TEM observation image which includes several hundreds of primary particles, and then a particle size distribution is measured. From a measured particle size distribution on the number basis, an average value of the particle size of primary particles on the number basis is calculated. The average value that is measured in this manner is set as an average particle size of the primary particles of the Sr ferrite particles.

In the pulverizing step, the Sr ferrite particles, which are obtained by calcining the mixture obtained in the mixing step, are pulverized to prepare a pulverized powder. In this embodiment, the pulverization is performed in two steps including a rough pulverizing step and a fine pulverizing step. In addition, in other several embodiments, the pulverizing step may be performed in one step. Typically, the Sr ferrite particles are present in a granular state or an agglomerated state. Accordingly, it is preferable to perform the rough pulverizing step. In the rough pulverizing step, pulverization is performed in a dry type by using a vibration rod mill and the like to obtain a roughly pulverized powder. The Sr ferrite particles of this embodiment are not limited to the roughly pulverized powder, and may be a finely pulverized powder to be described later.

In the fine pulverizing step, the roughly pulverized powder that is prepared as described above is pulverized in a wet type by using a wet-type attritor, a ball mill, a jet mill, and the like, thereby obtaining finely pulverized powder. For example, in a case of using the wet-type attritor, a pulverization time is 30 minutes to 10 hours, and in a case of using the ball mill, the pulverization time is 5 hours to 50 hours. It is preferable that the pulverization time be appropriately adjusted in accordance with a pulverization method. In a producing method in this embodiment, the calcination is performed at a low temperature in comparison to the related art, and thus the primary particles of the Sr ferrite are finer than that of comparison to the related art. Accordingly, in the pulverizing step (particularly, the fine pulverizing step), secondary particles that are mainly formed by agglomeration of the primary particles are dispersed into fine primary particles.

In the rough pulverizing step and/or the fine pulverizing step, powders of $SiO_2$, $CaCO_3$, $SrCO_3$, $BaCO_3$, and the like that are accessory components may be added. When the accessory components are added, it is possible to improve the sinterability and the magnetic characteristics. In addition, in a case of performing wet molding, the accessory components may flow out together with a solvent of slurry, and thus it is preferable to blend the accessory component in an amount more than a target amount in the sintered Sr ferrite magnet.

To increase a magnetic orientation degree of the sintered Sr ferrite magnet, it is preferable to add a dispersing agent such as polyhydric alcohol in the fine pulverizing step in addition to the above-described accessory component. An added amount of the dispersing agent is 0.05 to 5.0% by mass with respect to an object to which the dispersing agent is added, preferably 0.1 to 3.0% by mass, and more preferably 0.3 to 2.0% by mass. In addition, the added dispersing agent is removed by thermal decomposition in the sintering step.

The specific surface area of the pulverized powder, which is obtained in the pulverizing step, according to the BET method is preferably 6 $m^2/g$ or more from the viewpoint of making the structure of finally obtained sintered Sr ferrite magnet sufficiently fine, and more preferably 8 $m^2/g$ or more. In addition, the specific surface area of the pulverized powder according to the BET method is preferably 12 $m^2/g$ or less from the viewpoint of obtaining satisfactory moldability during manufacturing of a molded body, and more preferably 10 $m^2/g$ or less. The pulverized powder having the above-described specific surface area is sufficiently fine and handability and moldability are excellent, and thus it is possible to make the structure of the sintered Sr ferrite magnet further finer while maintaining process simpleness. As a result, it is possible to further improve the magnetic characteristics of the sintered Sr ferrite magnet.

The molding step is a step of molding the pulverized powder in a magnetic field to prepare a molded body. In the molding step, first, molding in a magnetic field, in which the pulverized powder obtained in the pulverizing step is molded in a magnetic field to prepare a molded body, is performed. The molding in a magnetic field may be performed by either dry molding or wet molding. However, the wet molding is preferable from the viewpoint of increasing the magnetic orientation degree. In a case of performing the wet molding, wet pulverization, in which a pulverized powder and a dispersion medium are blended and pulverization is performed, is performed to prepare slurry, and a molded body may be prepared by using the slurry. Concentration of the slurry may be performed by centrifugal separation, filter pressing, and the like.

It is preferable that an amount of a solid content in the slurry be 30 to 85% by mass. As the dispersion medium of the slurry, water or a non-aqueous solvent may be used. In addition to water, surfactants (dispersing agent) such as gluconic acid, gluconate, and sorbitol may be added to the slurry. The molding in a magnetic field is performed by using the slurry to prepare a molded body. A molding pressure is, for example, 0.1 to 0.5 $ton/cm^2$, and an applied magnetic field is, for example, 5 to 15 kOe.

The sintering step is a step of firing the molded body at 1000° C. to 1250° C. to obtain the sintered Sr ferrite magnet. Typically, the firing is performed in an oxidizing atmosphere such as the air. For example, a firing temperature is 1000 to 1250° C., and preferably 1100 to 1200° C. For example, a firing time at the firing temperature is 0.5 to 3 hours. Through the above-described steps, a sintered body, that is, the sintered Sr ferrite magnet 10 can be obtained.

In the method for producing the sintered Sr ferrite magnet of this embodiment, since fine Sr ferrite particles in which an average particle size of primary particles is small are used, it is possible to obtain a sintered Sr ferrite magnet in which a structure is fine and uniformity is high. The sintered Sr ferrite magnet is excellent in all characteristics including the squareness ratio (Hk/HcJ), the residual magnetic flux density (Br), and the coercive force (HcJ), and has high reliability. The sintered Sr ferrite magnet is suitably used as a magnet for motors or generators.

Hereinbefore, the preferred embodiment of the invention has been described, but the invention is not limited to the above-described embodiment. For example, the shape of the sintered Sr ferrite magnet is not limited to the shape shown in FIG. 1, and may be appropriately changed to shapes that are suitable for the respective uses described above. In addition, the motor of the invention is not limited to the embodiment of FIGS. 2 and 3, and various motors are included in the motor of the invention. Similarly, various types are included in the generator of the invention.

EXAMPLES

The contents of the invention will be described in more detail with reference to Examples and Comparative Examples, but the invention is not limited to the following Examples.

[Preparation and Evaluation of Sr Ferrite Particle]

Examples 1-1 to 1-6, and Comparative Examples 1-1 and 1-2

The following starting raw materials were prepared. A $Fe_2O_3$ powder is a powder prepared according to the spray firing method. In addition, the specific surface area is a value measured according to the BET method.

$Fe_2O_3$ powder (specific surface area: 4.4 $m^2/g$): 220 g $SrCO_3$ powder (specific surface area: 5.0 $m^2/g$): 35.23 g The above-described $Fe_2O_3$ powder and $SrCO_3$ powder were mixed while being pulverized with a wet-type ball mill for 16 hours to obtain slurry. Powders of alkali metal compounds shown in Table 1 were added to the slurry. An added amount at this time was set as shown in Table 1 with respect to the total mass of the $Fe_2O_3$ powder and the $SrCO_3$ powder (Added amount of Na or K in Table).

Then, spray drying of the slurry was performed to obtain a granular mixture having a particle size of approximately 10 μm, and then the mixture was fired in the air for 1 hour at a firing temperature (T1) shown in Table 1 to obtain granular Sr ferrite particles. The saturation magnetization ($\sigma_s$: emu/g) of the Sr ferrite powder that was obtained was measured by using a commercially available vibration sample type magnetometer (VSM). A measurement method was as follows. A magnetization ($\sigma$) was measured in a magnetic field (Hex) of 16 kOe to 19 kOe by using the VSM (trade name: VSM-3 type, manufactured by TOEI INDUSTRY CO., LTD.). In addition, a value ($\sigma_s$) of $\sigma$ in indefinite Hex was calculated in accordance with the law of approach to saturation. That is, linear approximation was performed by plotting σ with respect to 1/Hex², and a value when extrapolating 1/Hex² to 0. A correlation coefficient at this time was 99% or more. Results obtained by performing measurement as described above are shown in Table 1.

Comparative Examples

Sr ferrite particles were prepared in the same manner as Example 1-1 except that the powder of the alkali metal compound was not added. The saturation magnetization ($\sigma_s$) of the Sr ferrite particles that were obtained was measured in the same manner as Example 1-1. Results thereof are shown in a right end column of Table 1.

ferrite magnet, which had satisfactory external appearance and in which Br+⅓HcJ was 5.5 or more, was obtained. In the same sequence, sintered Sr ferrite magnets of Comparative Examples were prepared by using Sr ferrite particles in which the added amount of the alkali metal compound (sodium orthosilicate) was 1.14% by mass (firing temperature T2=1160° C.). An external appearance evaluation of the sintered Sr ferrite magnets, which were obtained, was performed. From the evaluation, it could be seen that a white powder precipitated to a surface. From this result, it was confirmed that when the added amount of the alkali metal compound was excessive, the sintered Sr ferrite magnet having a satisfactory external appearance was not obtained.

TABLE 1

| | | Alkali metal compound | | | | | | | | | | | | | | | |
|---|---|---|---|---|---|---|---|---|---|---|---|---|---|---|---|---|---|
| | | Sodium metasilicate | | | | | Sodium orthosilicate | | | $Na_2CO_3$ | | | | | | $K_2CO_3$ | No addition (*3) |
| | | Added amount of Na or K (*1) | | | | | | | | | | | | | | | |
| | T1 (° C.) | 0.21 | 0.42 | 0.62 | 0.83 | 1.04 | 0.38 | 0.76 | 1.14 (*2) | 0.03 | 0.06 | 0.12 | 0.18 | 0.29 | 0.58 | 0.88 | 0.85 | 0.00 |
| | | $\sigma_s$ (emu/g) | | | | | | | | | | | | | | | |
| Comparative Example 1-1 | 800 | 39.2 | 39.4 | 33.4 | 32.5 | 23.4 | 33.3 | 29.6 | 30.6 | 3.0 | 4.9 | 8.7 | 28.7 | 50.8 | 56.1 | 59.0 | 2.4 | 1.3 |
| Example 1-1 | 850 | 63.3 | 67.0 | 67.7 | 66.1 | 65.6 | 67.3 | 67.9 | 64.2 | 60.0 | 60.4 | 63.8 | 65.5 | 68.2 | 67.3 | 66.4 | 65.5 | 55.3 |
| Example 1-2 | 900 | 68.0 | 69.3 | 68.9 | 68.6 | 68.5 | 69.6 | 68.9 | 68.3 | 67.2 | 66.2 | 65.8 | 68.4 | 68.2 | 68.8 | 67.6 | 67.2 | 65.0 |
| Example 1-3 | 950 | 69.4 | 70.9 | 69.7 | 69.1 | 69.0 | 69.7 | 68.8 | 68.0 | 67.1 | 66.9 | 68.1 | 68.4 | 69.1 | 67.9 | 66.6 | 70.8 | 66.1 |
| Example 1-4 | 1000 | 69.6 | 70.7 | 70.3 | 68.8 | 69.8 | 69.6 | 69.4 | 68.5 | 68.0 | 68.2 | 69.3 | 70.9 | 68.3 | 68.5 | 67.3 | 70.4 | 66.4 |
| Example 1-5 | 1050 | 70.2 | 71.6 | 70.5 | 69.1 | 69.3 | 70.6 | 70.0 | 67.9 | 70.2 | 69.9 | 68.3 | 69.6 | 70.3 | 68.4 | 67.3 | 68.8 | 66.7 |
| Example 1-6 | 1100 | 72.6 | 71.6 | 70.4 | 69.7 | 69.3 | 70.8 | 69.5 | 68.0 | 70.9 | 68.6 | 68.7 | 71.0 | 70.7 | 69.1 | 67.4 | 69.2 | 66.9 |
| Comparative Example 1-2 | 1200 | 73.1 | 71.7 | 70.5 | 70.4 | 70.1 | 70.4 | 69.1 | 68.1 | 71.2 | 70.9 | 71.9 | 71.3 | 70.4 | 68.7 | 68.2 | 70.3 | 71.4 |

(*1) An added amount of Na is a mass ratio (% by mass) in terms of $Na_2O$, and an added amount of K is a mass ratio (% by mass) in terms of K (*2) An added amount of the alkali metal compound exceeds the upper limit, and thus all examples are Comparative Examples.

(*3) The alkali metal compound is not added, and thus all examples are Comparative Examples.

The average particle size of primary particles of the Sr ferrite particles, which were obtained in respective Examples and Comparative Examples shown in Table 1, was measured. As a result, in a case where the firing temperature T1 was 1100° C. or lower, the average particle size was 0.2 to 1 μm in all cases. In contrast, in a case where the firing temperature T1 was 1200° C., the average particle size exceeded 1 μm.

In Examples 1-1 to 1-6, Sr ferrite particles having a high saturation magnetization of 67 emu/g or more were obtained in a wide firing temperature (T1) range. This corresponds to 93% or more of 71.5 emu/g that is a theoretical value of the Sr ferrite, and shows that the ferrite forming reaction considerably progresses. On the other hand, when the added amount of the alkali metal compound increases, the saturation magnetization tends to decrease. In a range in which the firing temperature (T1) was higher than 1100° C. during preparation of the Sr ferrite particles, even when raising the firing temperature, it was recognized that the saturation magnetization was not improved in most cases, and the particles tend to be coarsened.

Sintered Sr ferrite magnets were prepared by using the Sr ferrite particles of respective Examples in the same sequence as Example 3-1 to be described later (firing temperature T2=1160° C.). As a result, in all Examples, a sintered Sr Examples 2-1 to 2-5, and Comparative Examples 2-1 and 2-2

The same $Fe_2O_3$ powder and $SrCO_3$ powder as that used in Example 1-1 were mixed while being pulverized with a wet-type ball mill for 16 hours to obtain slurry. Powders of alkali metal compounds shown in Table 2 were added to the slurry. An added amount at this time was set to 0.38% by mass in terms of $Na_2O$ with respect to the total mass of the $Fe_2O_3$ powder and the $SrCO_3$ powder.

Then, spray drying of the slurry was performed to obtain a mixed powder, and the mixed powder was fired in the air for 1 hour at a firing temperature (T1) shown in Table 2 to obtain granular Sr ferrite particles. The saturation magnetization ($\sigma_s$: emu/g) of the obtained Sr ferrite particles of respective Examples and Comparative Examples was measured by using the vibration sample type magnetometer. Measured results are shown in Table 2.

Comparative Examples

Sr ferrite particles were prepared in the same manner as Example 1-1 except that the alkali metal compound was not added. The saturation magnetization ($\sigma_s$) of the Sr ferrite particles that were obtained was obtained in the same manner as Example 1-1. Results thereof are shown in a right end column of Table 2.

TABLE 2

| | | Alkali metal compound | | | | |
|---|---|---|---|---|---|---|
| | | Sodium polycarboxylate type dispersing agent | Na$_2$CO$_3$ powder | Sodium orthosilicate powder | Na-containing iron oxide powder | NaCl powder (*2) | No addition (*3) |
| | | Added amount of Na (*1) | | | | |
| | T1 (° C.) | 0.38 | 0.38 | 0.38 σ$_s$ (emu/g) | 0.38 | 0.38 | 0.00 |
| Comparative Example 2-1 | 800 | 20.8 | 44.5 | 39.9 | 34.8 | 5.0 | 3.1 |
| Example 2-1 | 850 | 70.4 | 69.0 | 68.0 | 66.7 | 58.4 | 59.0 |
| Example 2-2 | 900 | 70.7 | 69.9 | 69.8 | 70.0 | 66.4 | 65.4 |
| Example 2-3 | 950 | 70.5 | 70.3 | 71.6 | 69.9 | 67.4 | 66.4 |
| Example 2-4 | 1000 | 70.9 | 70.2 | 71.6 | 69.9 | 68.8 | 66.9 |
| Example 2-5 | 1100 | 70.7 | 70.6 | 70.2 | 70.6 | 70.4 | 69.4 |
| Comparative Example 2-2 | 1200 | 71.7 | 71.5 | 70.5 | 72.0 | 70.5 | 70.4 |

(*1) An added amount of Na is a mass ratio (% by mass) in terms of Na$_2$O.
(*2) All examples are Comparative Examples.
(*3) The alkali metal compound is not added, and thus all examples are Comparative Examples.

The average particle size of primary particles of the Sr ferrite particles, which were obtained in respective Examples and Comparative Examples shown in Table 2, was measured. As a result, in a case where the firing temperature T1 was 1100° C. or lower, the average particle size was 0.2 to 1 μm in all cases. In contrast, in a case where the firing temperature T1 was 1200° C., the average particle size exceeded 1 μm.

From results shown in Table 2, it was confirmed that in Examples 2-1 to 2-5 in which a sodium compound was added, the Sr ferrite was formed at a lower temperature in comparison to Comparative Example in which the sodium compound was not added and Comparative Examples in which a NaCl powder was added. In addition, in a range in which the firing temperature (T1) was higher than 1100° C. during preparation of the Sr ferrite particles, even when raising the firing temperature, it was recognized that the saturation magnetization was not improved in most cases, and the particles tend to be coarsened.

[Preparation of Sintered Sr Ferrite Magnet]

Examples 3-1 and 3-2

The Fe$_2$O$_3$ powder and the SrCO$_3$ powder were mixed while being pulverized with a wet-type ball mill for 16 hours in the same manner as Example 1-1, thereby obtaining slurry. A sodium metasilicate powder was added to the slurry. An added amount at this time was set to 0.42% by mass in terms of Na$_2$O with respect to the total mass of the Fe$_2$O$_3$ powder and the SrCO$_3$ powder. Then, spray drying of the slurry was performed to obtain a granular mixture having a particle size of approximately 10 μm, and then the mixture was fired in the air at 950° C. for 1 hour to obtain granular Sr ferrite particles.

Figure 5:
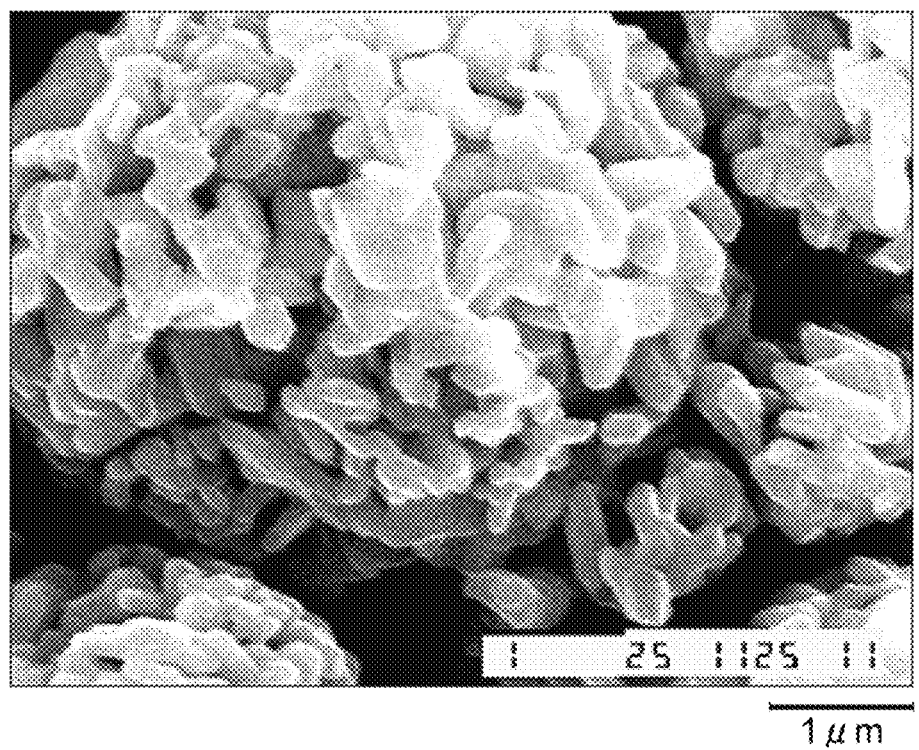
FIG. 5 is an electron microscope photograph of Sr ferrite particles before wet pulverization in Examples 3-1 and 3-2.
Figure 6:
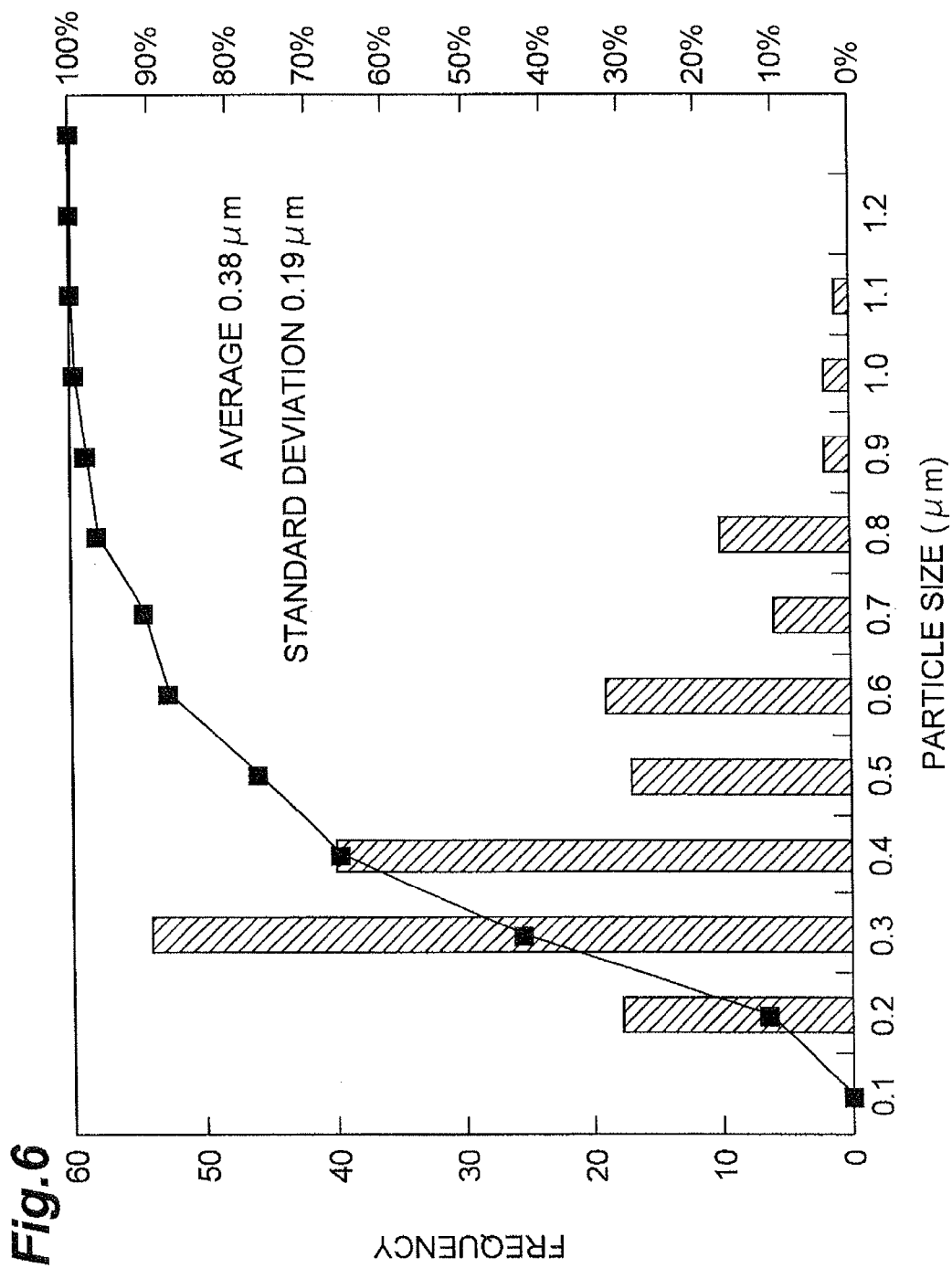
FIG. 6 is a graph illustrating a particle size distribution of the Sr ferrite particles shown in FIG. 5.

The magnetic characteristics of the Sr ferrite particles that were obtained were measured in the same manner as Example 1-1. As a result, the saturation magnetization (σ$_s$) was 69.7 emu/g, and the coercive force (HcJ) was 3.278 kOe. In addition, the specific surface area of the Sr ferrite particles was 2.7 m$^2$/g, and the average particle size of primary particles was 0.4 μm. FIG. 5 is an electron microscope photograph of the Sr ferrite particles at this time. FIG. 6 is a graph illustrating a particle size distribution of the Sr ferrite particles. 1% by mass of sorbitol and 0.6% by mass of CaCO$_3$ were added to 130 g of the Sr ferrite particles, and then wet pulverization was performed for 16 hours with a ball mill to obtain slurry. The slurry was dehydrated to obtain pulverized powders. The specific surface area of the obtained pulverized powder in accordance with the BET method was 8.2 m$^2$/g.

Figure 7:
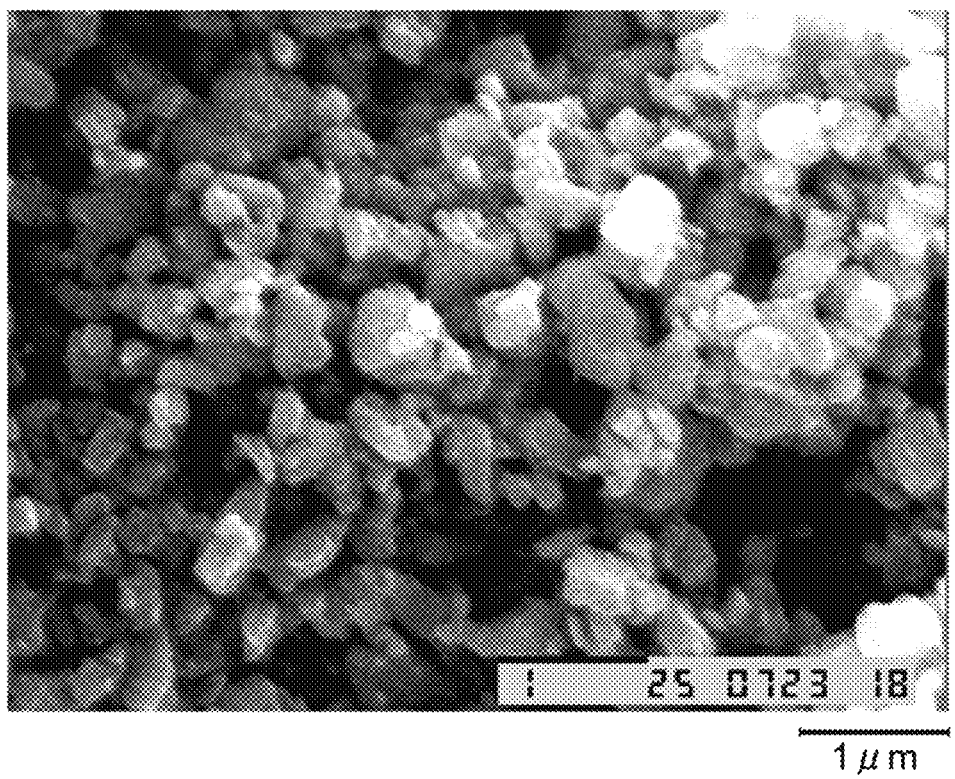
FIG. 7 is an electron microscope photograph of a pulverized powder after the wet pulverization in Examples 3-1 and 3-2.
Figure 8:
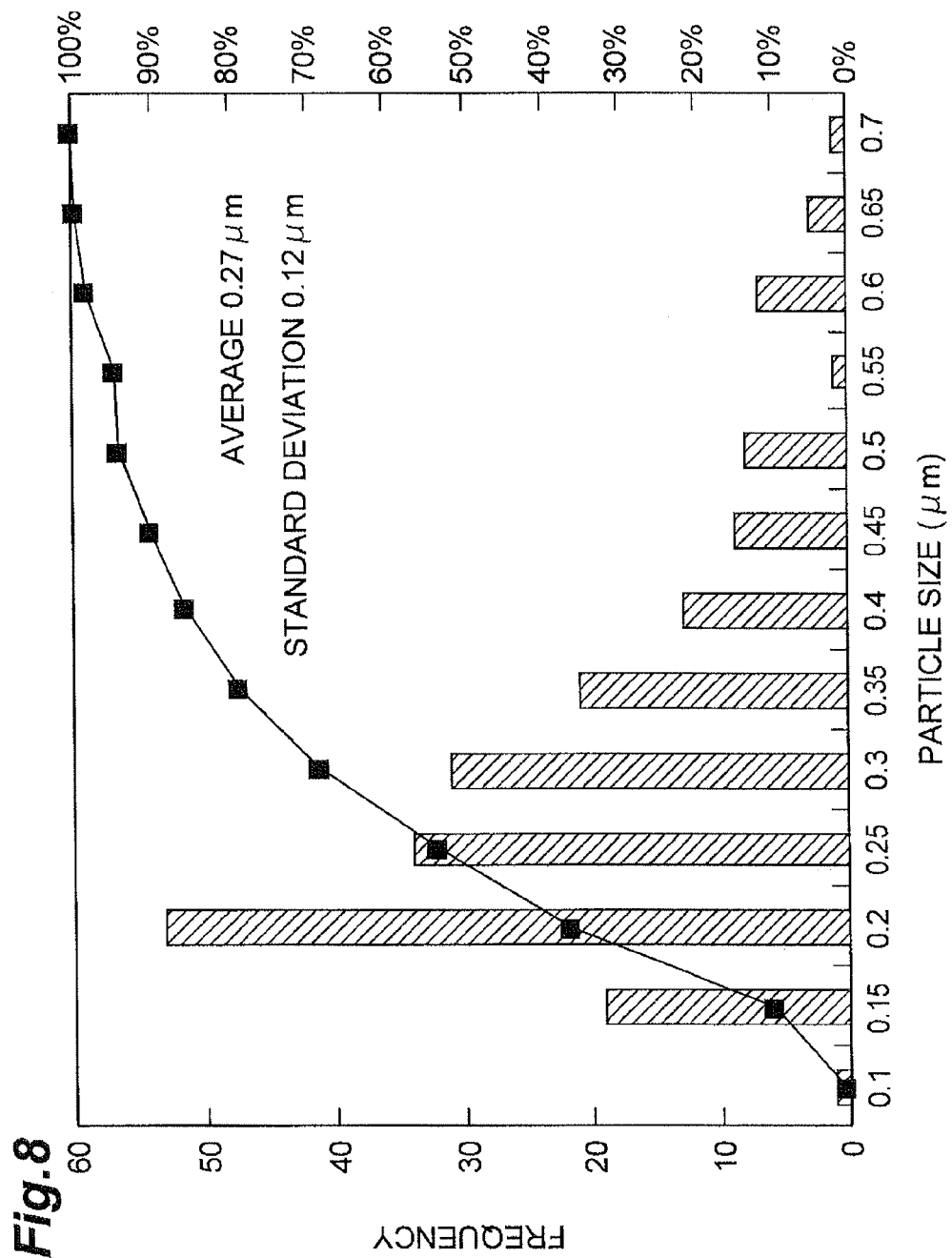
FIG. 8 is a graph illustrating a particle size distribution of the pulverized powder shown in FIG. 7.

FIG. 7 is an electron microscope photograph of the pulverized powder that was obtained by wet-pulverizing the Sr ferrite particle with a ball mill. FIG. 8 is a graph illustrating a particle size distribution of the pulverized powder. The pulverized powders, which were prepared in Examples 3-1 and 3-2, did not contain coarse particles having a particle size of 1 μm or more. In addition, a ratio of ultrafine particles having a particle size of 0.1 μm or less decreased.

Figure 12:
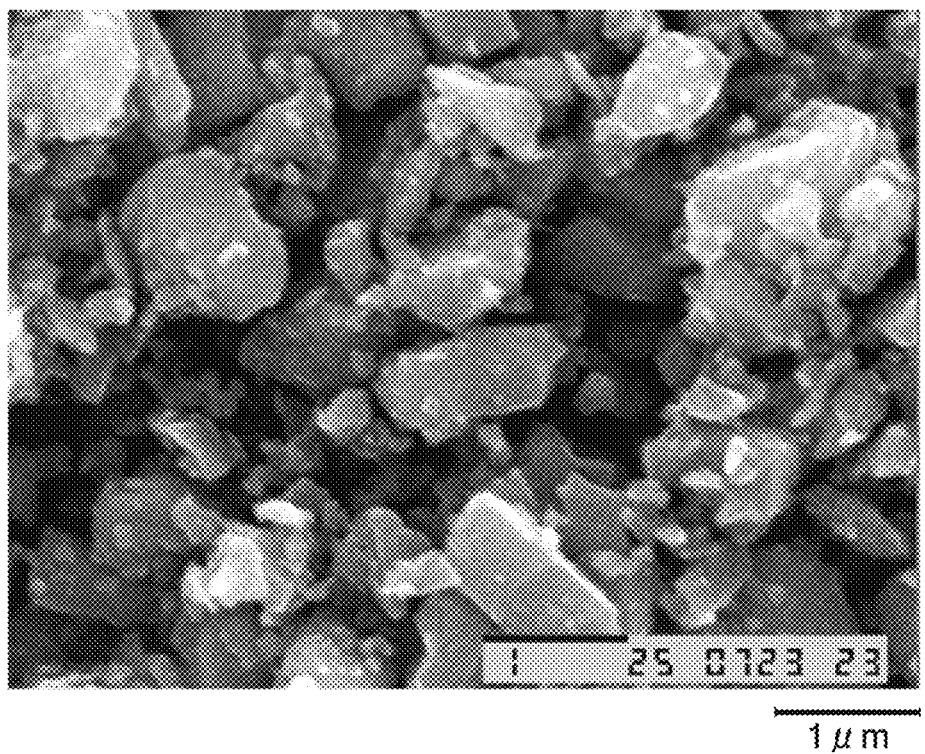
FIG. 12 is an electron microscope photograph of a pulverized powder that is prepared according to a producing method in the related art.

FIG. 12 is an electron microscope photograph of a pulverized powder that was prepared according to a producing method in the related art. The pulverized powder of FIG. 12 was prepared in the same manner as Examples 3-1 and 3-2 except that the sodium metasilicate powder was not added before the calcination, the firing temperature when obtaining the Sr ferrite particles was set to 1250° C., and the wet pulverization with a ball mill was performed for 23 hours. From comparison between FIG. 7 and FIG. 12, it was confirmed that the pulverized powders prepared in Examples 3-1 and 3-2 were fine, had a sharp particle size distribution, and were excellent in uniformity in comparison to the pulverized powder in the related art.

A concentration of slurry containing the pulverized powder in FIG. 7 as a solid content was adjusted. The slurry in which the concentration of the solid content was adjusted was introduced to a wet-type magnetic field molding machine, and molding was performed in an applied magnetic field of 12 kOe to obtain a cylindrical molded body. The molded body was fired in the air at a firing temperature (T2) of 1160° C. to 1200° C. for 1 hour to obtain sintered ferrite magnets of Examples 3-1 and 3-2. The firing temperature (T2) in respective Examples was set as described in Table 3.

Comparative Examples 3-1 and 3-2

Sintered ferrite magnets of Comparative Examples 3-1 and 3-2 were prepared in the same manner as Examples 3-1 and 3-2 except that the sodium metasilicate was not added to slurry. The firing temperature (T2) in respective Comparative Examples was set as described in Table 3. In addition, in Sr ferrite particles which were prepared in Comparative Examples 3-1 and 3-2, the saturation magnetization ($\sigma_s$) was 65.5 emu/g, the coercive force (HcJ) was 3.09 kOe, the specific surface area according to the BET method was 3.1 m$^2$/g, and the average particle size of primary particles was 0.5 μm. In addition, the specific surface area of a pulverized powder, which was obtained by wet pulverization, according to the BET method was 10.2 m$^2$/g.

Comparative Examples 3-3 to 3-5

Granular Sr ferrite particles were obtained in the same manner as Example 3-1 except that a NaCl powder was used instead of the sodium orthosilicate powder and the firing temperature (T1) when preparing Sr ferrite particles was set to 900° C. An added amount of the NaCl powder was set to 0.38% by mass in terms of Na$_2$O with respect to the total mass of the Fe$_2$O$_3$ powder and the SrCO$_3$ powder. In addition, a molded body was prepared in the same manner as Example 3-1. The molded body was fired in the air at a firing temperature (T2) of 1160° C. to 1200° C. for 1 hour to obtain a sintered Sr ferrite magnet of Comparative Examples 3-3 to 3-5. The firing temperature (T2) of the molded body in respective Comparative Examples was set as described in Table 3. The magnetic characteristics of the sintered Sr ferrite magnet of Comparative Examples 3-3 to 3-5 were measured in the same manner as Example 3-1. Results thereof are shown in Table 3.

[Evaluation of Sintered Sr Ferrite Magnet]

<Evaluation of Magnetic Characteristics>

Upper and lower surfaces of each of the sintered Sr ferrite magnet of respective Examples and Comparative Examples were processed, and the magnetic characteristics were measured by using a B-H tracer in which a maximum applied magnetic field was 25 kOe. In the measurement, Br, HcJ, bHc, and (BH)$_{max}$ were obtained, and an external magnetic field intensity (Hk) when reaching 90% of the Br was measured, and the squareness ratio (Hk/HcJ (%)) was obtained on the basis of the resultant measured values. In addition, the value of Br+⅓HcJ was calculated. These results are shown in Table 3.

<Evaluation of External Appearance>

The external appearance of the sintered Sr ferrite magnets of respective Examples and Comparative Examples was evaluated with a naked eye. A case in which precipitation of a white powder to a surface did not occur was evaluated as "A", and a case in which the precipitation of the white powder to the surface occurred was evaluated as "B".

In the sintered Sr ferrite magnets of Examples 3-1 and 3-2, numerical values of the squareness ratio and Br+⅓HcJ were high. In contrast, in the sintered Sr ferrite magnets of Comparative Examples 3-1, 3-2, and 3-5, the squareness ratio was low. That is the reason why a structure of a sintered body was not uniform by occurring abnormal grain growth in the sintering step, since the Sr ferrite was not sufficiently generated in the Sr ferrite particles in Comparative Examples 3-1 and 3-2. In addition, in Comparative Examples 3-3 to 3-5, the value of Br+⅓HcJ was low.

TABLE 3

| | Firing temperature | Magnetic characteristics | | | | | | |
| --- | --- | --- | --- | --- | --- | --- | --- | --- |
| | T2 °C. | Br G | bHc Oe | HcJ Oe | (BH)$_{max}$ MGOe | Hk/HcJ % | Br + ⅓HcJ | External appearance |
| Example 3-1 | 1160 | 4105 | 3903 | 4472 | 4.06 | 95.3 | 5.60 | A |
| Example 3-2 | 1180 | 4164 | 3920 | 4344 | 4.18 | 93.5 | 5.61 | A |
| Comparative Example 3-1 | 1160 | 4103 | 3687 | 4845 | 4.05 | 75.5 | 5.72 | A |
| Comparative Example 3-2 | 1180 | 4158 | 3531 | 4710 | 4.16 | 67.7 | 5.73 | A |
| Comparative Example 3-3 | 1160 | 3946 | 3786 | 4566 | 3.78 | 92.5 | 5.47 | A |
| Comparative Example 3-4 | 1180 | 3992 | 3790 | 4440 | 3.87 | 91.6 | 5.47 | A |
| Comparative Example 3-5 | 1200 | 4090 | 3293 | 4200 | 3.77 | 59.4 | 5.49 | A |

<Composition Analysis>

A composition of the sintered ferrite magnet of Example 3-2 was measured by fluorescent X-ray analysis. Amounts of Fe, Sr, Na, and Si in terms of Fe$_2$O$_3$, SrO, Na$_2$O, and SiO$_2$ were 88.4% by mass, 10.4% by mass, 0.043% by mass, and 0.323% by mass on the basis of the entirety of the sintered ferrite magnet. In addition, K was not detected. The sintered ferrite magnet contained a minor component caused by impurities of raw materials in addition to Fe, Sr, Na, and Si. The amounts of the respective oxides are values that are obtained after performing calculation with respect to the impurities in terms of oxides.

<Analysis of Microstructure>

Figure 9:
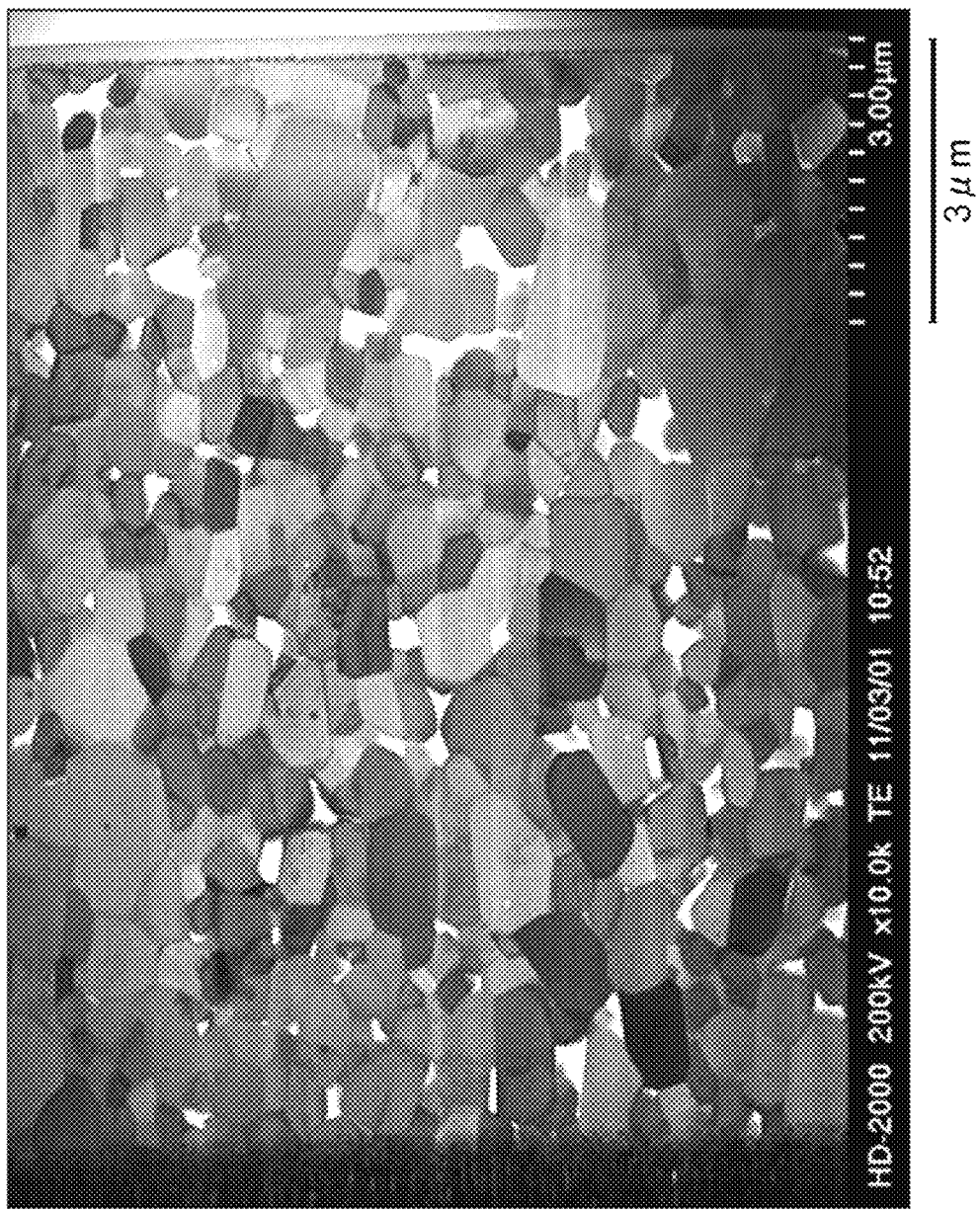
FIG. 9 is an electron microscope photograph in which a cross-section of the sintered Sr ferrite magnet of Example 3-2 is shown in an enlarged manner.

The sintered Sr ferrite magnet of Example 3-2 was sliced along a cross-section (a-plane), and the cross-section was observed with a TEM. FIG. 9 is an electron microscope photograph of the etched surface. In an observed image, a contour of crystal grains of the Sr ferrite was made to be clear, and then a grain size distribution of crystal grains of the Sr ferrite on the number basis was measured by image processing.

Figure 10:
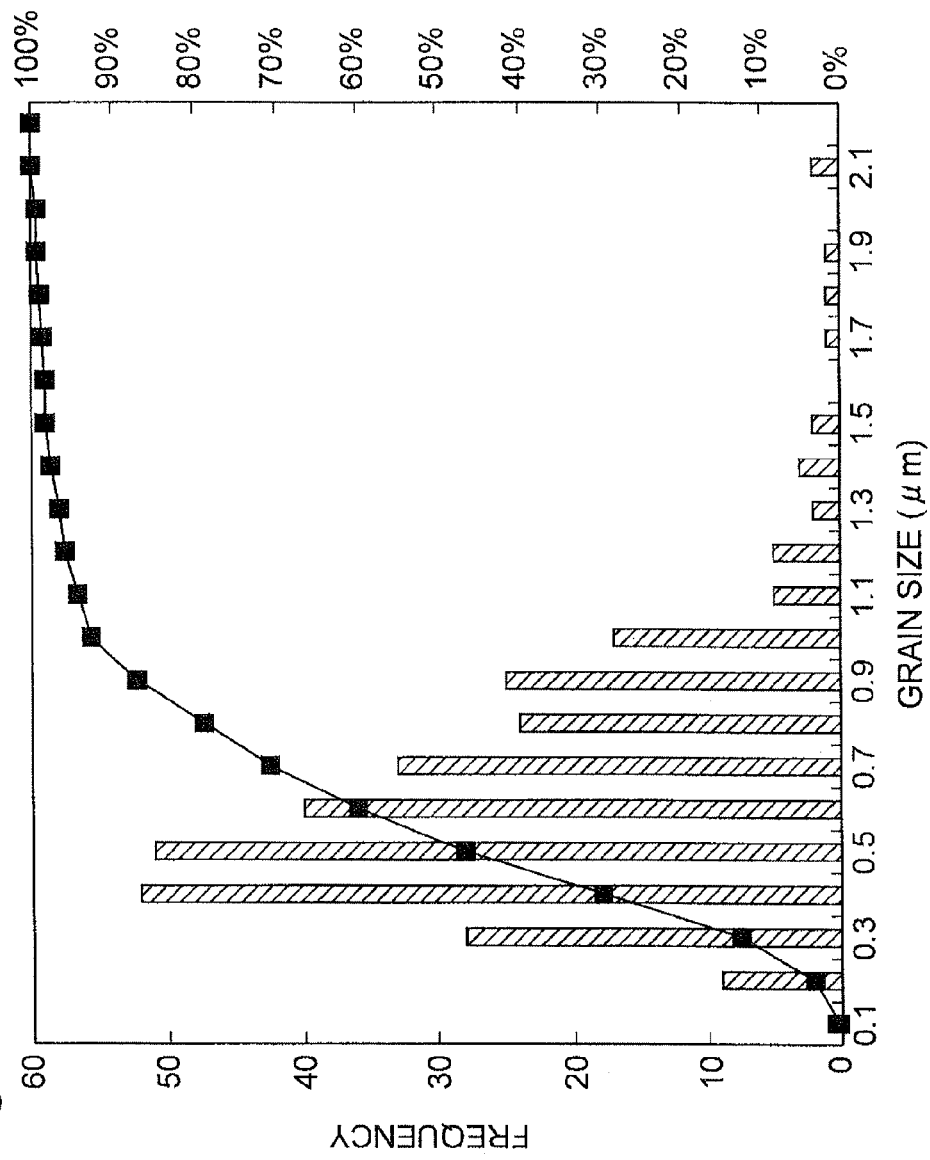
FIG. 10 is a graph illustrating a grain size distribution of crystal grains of Sr ferrite that is included in the sintered ferrite magnet of Example 3-2.

FIG. 10 is a histogram illustrating a grain size distribution of crystal grains of the Sr ferrite contained in the sintered ferrite magnet of Example 3-2. From grain size distribution data, an average grain size of crystal grains of the Sr ferrite on the number basis and a standard deviation thereof were obtained. In addition, aspect ratios of respective crystal grains were measured, and an average value of the aspect ratios on the number basis and a standard deviation thereof were obtained. These results are shown in Table 4.

In Example 3-2, a ratio of crystal grains having a grain size of 1.8 μm or more on the number basis with respect to the entirety of crystal grains of the Sr ferrite was 1% or less. That is, it was confirmed that uniformity in size of crystal grains was sufficiently high in the sintered Sr ferrite magnet. From this result, when using Sr ferrite particles which contain a predetermined amount of alkali metal compound that includes Na and/or K as a constituent element and does not include Cl and S as the constituent element, and which are obtained by performing firing at a temperature as low as 950° C., it was confirmed that it is possible to obtain a sintered Sr ferrite magnet which has high squareness ratio and in which a value of Br+⅓HcJ is 5.60 or more.

TABLE 4

| | | Grain size (μm) | Aspect ratio |
|---|---|---|---|
| Example 3-2 | Average value | 0.59 | 1.66 |
| | Standard deviation | 0.31 | 0.51 |

[Effect of Chlorine]

Sr ferrite particles were prepared in the same manner as Example 3-1 except that the firing temperature (T1) was set to 900° C. and 1050° C., respectively. Fluorescent X-ray analysis of each Sr ferrite powder that was prepared was performed. In addition, for comparison, a solid content of slurry before firing at the firing temperature (T1) was dried, and fluorescent X-ray analysis was performed with respect to the resultant dried material that was obtained. These results are shown in Table 5.

TABLE 5

| | Firing temperature | Fluorescent X-ray analysis (wt %) | |
|---|---|---|---|
| | T1 (° C.) | Na$_2$O | Cl |
| Dried material of slurry | — | 0.397 | 0.142 |
| Sr ferrite particles | 900 | 0.210 | 0.036 |
| Sr ferrite particles | 1050 | 0.047 | 0.002 |

From results of Table 5, it was confirmed that Na that was added and Cl of an impurity were reduced due to firing in the calcining step. From this result, it is considered that in the calcining step, scattering occurs in a NaCl form. In addition, Sr ferrite particles obtained by setting the firing temperature (T1) in Table 5 to 900° C. correspond to Sr ferrite particles of Example 5-1 to be described later.

[Preparation and Evaluation of Sintered Sr Ferrite Magnet]

Examples 4-1 to 4-4

Granular Sr ferrite particles were prepared in the same manner as Example 3-1 except that the sodium orthosilicate powder was used instead of the sodium metasilicate powder, and an added amount of the sodium orthosilicate powder was set to 0.38% by mass in terms of Na$_2$O with respect to the total mass of the Fe$_2$O$_3$ powder and the SrCO$_3$ powder.

In the Sr ferrite particles that were obtained, the saturation magnetization ($\sigma_s$) was 70.5 emu/g, and the coercive force (HcJ) was 3.83 kOe. In addition, the specific surface area of the Sr ferrite particles was 2.7 m$^2$/g, and the average particle size of primary particles was 0.5 μm. 1% by mass of sorbitol, 0.4% by mass of SiO$_2$, and 0.9% by mass of CaCO$_3$ were added to 130 g of the Sr ferrite particles, and wet pulverization was performed with a ball mill, thereby preparing slurry. At this time, a wet pulverization time was adjusted in a range of 10 hours to 28 hours to prepare finely pulverized powders of Examples 4-1 to 4-4 in which the specific surface areas were different from each other. The specific surface areas of the respective finely pulverized powders, which were obtained, according to the BET method were as described in Table 6.

Slurry in which a concentration of a solid content was adjusted was introduced to a wet-type magnetic field molding machine, and molding was performed with an applied magnetic field of 12 kOe to obtain a cylindrical molded body. The molded body was fired in the air at 1160° C. to 1190° C. for 1 hour to obtain sintered Sr ferrite magnets of Examples 4-1 to 4-4. The firing temperature (T2) of respective Examples was set as described in Table 6. The magnetic characteristics and the external appearance of the sintered Sr ferrite magnets of Examples 4-1 to 4-4 were evaluated in the same manner as Example 3-1. Results thereof are shown in Table 6.

Comparative Examples 4-1 to 4-3

Sr ferrite particles were prepared in the same manner as Example 4-1 except that the firing temperature (T1) when obtaining the Sr ferrite particles was set to 1250° C. The specific surface area of the Sr ferrite particles was 1 m$^2$/g or less, and the average particle size of primary particles was 2 μm. 1% by mass of sorbitol, 0.3% by mass of SiO$_2$, and 0.6% by mass of CaCO$_3$ were added to 130 g of the Sr ferrite particles, and then rough pulverization with a dry-type vibration mill and a wet pulverization with a ball mill were performed to prepare slurry. A wet pulverization time was adjusted in a range of 17 hours to 35 hours to prepare pulverized powders of Comparative Examples 4-1 to 4-3 in which the specific surface areas were different from each other. The specific surface areas of the respective pulverized powders, which were obtained, according to the BET method were as described in Table 6.

Slurry in which a concentration of a solid content was adjusted was introduced to a wet-type magnetic field molding machine, and molding was performed with an applied magnetic field of 12 kOe to obtain a cylindrical molded body. The molded body was fired in the air at 1200° C. to 1240° C. for 1 hour to obtain sintered Sr ferrite magnets of Comparative Examples 4-1 to 4-3. The firing temperature (T2) of the molded bodies in respective Comparative Examples was set as described in Table 6. The magnetic characteristics and the external appearance of the sintered Sr ferrite magnets of Comparative Examples were evaluated in the same manner as Example 3-1. Results thereof are shown in Table 6. In the sintered Sr ferrite magnets of Examples 4-1 to 4-4, high squareness ratio (Hk/HcJ (%)) was maintained, and a value of Br+HcJ was higher than that of Comparative Examples.

TABLE 6

| | Specific surface area m²/g | Firing temperature T2 °C. | Magnetic characteristics | | | | | | External appearance |
|---|---|---|---|---|---|---|---|---|---|
| | | | Br G | bHc Oe | HcJ Oe | (BH)max MGOe | Hk/HcJ % | Br + ⅓HcJ | |
| Example 4-1 | 6.7 | 1160 | 3986 | 3778 | 4592 | 3.81 | 94.2 | 5.52 | A |
| | | 1180 | 4072 | 3845 | 4453 | 3.99 | 93.6 | 5.56 | |
| | | 1190 | 4073 | 3787 | 4356 | 3.98 | 91.1 | 5.53 | |
| Example 4-2 | 8.8 | 1160 | 4106 | 3877 | 4652 | 4.06 | 92.0 | 5.66 | A |
| | | 1180 | 4175 | 3898 | 4486 | 4.21 | 90.1 | 5.67 | |
| | | 1190 | 4213 | 3710 | 4361 | 4.25 | 83.5 | 5.67 | |
| Example 4-3 | 10.4 | 1160 | 4170 | 3940 | 4661 | 4.14 | 95.8 | 5.72 | A |
| | | 1180 | 4207 | 3997 | 4581 | 4.30 | 91.0 | 5.73 | |
| | | 1190 | 4219 | 3853 | 4460 | 4.30 | 87.3 | 5.71 | |
| Example 4-4 | 11.6 | 1160 | 4159 | 4002 | 4555 | 4.20 | 96.6 | 5.68 | A |
| | | 1180 | 4220 | 4012 | 4559 | 4.40 | 93.0 | 5.74 | |
| | | 1190 | 4245 | 3737 | 4409 | 4.29 | 81.8 | 5.71 | |
| Comparative Example 4-1 | 6.4 | 1200 | 4078 | 3348 | 3416 | 4.02 | 96.5 | 5.22 | A |
| | | 1220 | 4123 | 3579 | 3768 | 4.11 | 94.3 | 5.38 | |
| | | 1240 | 4141 | 3450 | 3641 | 4.13 | 93.4 | 5.35 | |
| Comparative Example 4-2 | 8.1 | 1200 | 4106 | 3468 | 3538 | 4.08 | 96.6 | 5.29 | A |
| | | 1220 | 4165 | 3656 | 3842 | 4.20 | 94.5 | 5.45 | |
| | | 1240 | 4193 | 3453 | 3690 | 4.24 | 91.9 | 5.42 | |
| Comparative Example 4-3 | 9.5 | 1200 | 4077 | 3702 | 3916 | 4.01 | 94.5 | 5.38 | A |
| | | 1220 | 4149 | 3639 | 3920 | 4.13 | 91.8 | 5.46 | |
| | | 1240 | 4248 | 2427 | 3417 | 2.88 | 28.8 | 5.39 | |

The respective sintered Sr ferrite magnets of Examples 4-1 to 4-4 contained approximately 0.04% by mass of Na in terms of $Na_2O$. In addition, in the respective sintered Sr ferrite magnets, a grain size of crystal grains of the Sr ferrite was 0.3 to 1.8 μm.

[Preparation and Evaluation of Sintered Sr Ferrite Magnet]

Examples 5-1 to 5-4

Granular Sr ferrite particles were obtained in the same manner as Example 3-1 except that the firing temperature (T1) when preparing the Sr ferrite particles was set to 900° C.

In the Sr ferrite particles that were obtained, the saturation magnetization ($\sigma_s$) was 69.4 emu/g, and the coercive force (HcJ) was 3.36 kOe. In addition, the specific surface area of the Sr ferrite particles according to the BET method was 2.7 m²/g, and the average particle size of primary particles was 0.4 μm. 1% by mass of sorbitol, 0.4% by mass of $SiO_2$, and 0.9% by mass of $CaCO_3$ were added to 130 g of the Sr ferrite particles, and then wet pulverization was performed with a ball mill for 22 hours, thereby obtaining slurry. The specific surface area of the pulverized powder, which was obtained, according to the BET method was 10.2 m²/g.

A $Na_2CO_3$ powder was added to the slurry to prepare four kinds of slurry in which amounts of Na are different from each other. At this time, an added amount of the $Na_2CO_3$ powder in the molded body was set to 0.04 to 0.14% by mass in terms of $Na_2O$. The added amount is shown in Table 7. Slurry in which a concentration of a solid content was adjusted was introduced to a wet-type magnetic field molding machine, and molding was performed with an applied magnetic field of 12 kOe to obtain a cylindrical molded body. The molded body was fired in the air at the firing temperature (T2) of 1160° C. to 1180° C. for 1 hour to obtain sintered Sr ferrite magnets of Examples 5-1 to 5-4. The firing temperature (T2) of the molded bodies in respective Examples was set as described in Table 7. The magnetic characteristics and the external appearance of the sintered Sr ferrite magnets of Examples 5-1 to 5-4 were evaluated in the same manner as Example 3-1. Results thereof are shown in Table 7.

The composition of the sintered Sr ferrite magnets of respective Examples was measured with fluorescent X-ray analysis. Amounts of Na, Si, Ca, Fe, and Sr in terms of $Na_2O$, $SiO_2$, CaO, $Fe_2O_3$, and SrO with respect to the entirety of the sintered Sr ferrite magnet are shown in Table 8 (unit is % by mass). In addition, K was not detected. The sintered Sr ferrite magnets contained a minor component caused by impurities of raw materials in addition to the above-described elements. The amounts of the respective oxides were calculated after performing calculation with respect to the impurities in terms of oxides.

TABLE 7

| | Added amount of Na % by mass | Firing temperature °C. | Magnetic characteristics | | | | | | External appearance |
|---|---|---|---|---|---|---|---|---|---|
| | | | Br G | bHc Oe | HcJ Oe | (BH)max MGOe | Hk/HcJ % | Br + ⅓HcJ | |
| Example 5-1 | 0.04 | 1160 | 4142 | 3970 | 4723 | 4.16 | 95.9 | 5.72 | A |
| | | 1170 | 4166 | 3999 | 4711 | 4.21 | 93.3 | 5.74 | |
| | | 1180 | 4183 | 3989 | 4620 | 4.25 | 92.5 | 5.72 | A |

TABLE 7-continued

|  | Added amount of Na % by mass | Firing temperature ° C. | Magnetic characteristics | | | | | | External appearance |
|---|---|---|---|---|---|---|---|---|---|
|  |  |  | Br G | bHc Oe | HcJ Oe | (BH)max MGOe | Hk/HcJ % | Br + ⅓HcJ |  |
| Example 5-2 | 0.06 | 1160 | 4181 | 4014 | 4739 | 4.24 | 95.3 | 5.76 |  |
|  |  | 1170 | 4186 | 4011 | 4671 | 4.26 | 93.5 | 5.74 |  |
|  |  | 1180 | 4212 | 3928 | 4548 | 4.29 | 90.1 | 5.73 | A |
| Example 5-3 | 0.09 | 1160 | 4159 | 3999 | 4700 | 4.20 | 93.5 | 5.73 |  |
|  |  | 1170 | 4231 | 4026 | 4588 | 4.35 | 92.6 | 5.76 |  |
| Example 5-4 | 0.14 | 1160 | 4143 | 3980 | 4630 | 4.17 | 94.2 | 5.69 | A |
|  |  | 1170 | 4230 | 3885 | 4507 | 4.30 | 88.7 | 5.73 |  |

In Table, "Amount of Na" represents an added amount in terms of $Na_2O$.

TABLE 8

|  | $Na_2O$ | $SiO_2$ | CaO | $Fe_2O_3$ | SrO |
|---|---|---|---|---|---|
| Example 5-1 | 0.044 | 0.482 | 0.522 | 88.1 | 10.2 |
| Example 5-2 | 0.057 | 0.476 | 0.521 | 88.1 | 10.4 |
| Example 5-3 | 0.104 | 0.478 | 0.531 | 88.0 | 10.3 |
| Example 5-4 | 0.162 | 0.468 | 0.533 | 88.0 | 10.3 |

[Preparation of Sintered Ferrite Magnet]

Examples 6-1 to 6-6

Slurry was obtained in the same manner as Example 1-1. A sodium carbonate powder was added to the slurry. At this time, an added amount of sodium carbonate was set to 0.38% by mass in terms of $Na_2O$ with respect to the total mass of the $Fe_2O_3$ powder and the $SrCO_3$ powder. Then, spray drying of the slurry was performed to obtain a granulated powder having a particle size of approximately 10 μm, and then the powder was fired in the air at a firing temperature (T1) shown in Table 9 for 1 hour to obtain granular Sr ferrite particles. The firing temperature and the specific surface area of the Sr ferrite particles according to the BET method are as described in Table 9. The magnetic characteristics of the Sr ferrite, which was obtained, were measured by using the vibration sample type magnetometer. Measured results are shown in Table 9.

1% by mass of sorbitol, 0.6% by mass of $SiO_2$, and 0.9% by mass of $CaCO_3$ were added to 130 g of the Sr ferrite particles, and then wet pulverization was performed with a ball mill for 22 hours, thereby preparing slurry. Slurry in which a concentration of a solid content was adjusted was introduced to a wet-type magnetic field molding machine, and molding was performed with an applied magnetic field of 12 kOe to obtain a cylindrical molded body. The molded body was fired in the air at the firing temperature (T2) shown in Table 9 for 1 hour to obtain sintered Sr ferrite magnets of Examples 6-1 to 6-6.

Example 6-7

A sintered Sr ferrite magnet of Example 6-7 was obtained in the same manner as Example 6-1 except that a sodium polycarboxylate type dispersing agent instead of the sodium carbonate powder was added to the slurry, and a powder having the specific surface area of 9.3 m²/g according to the BET method was used as the $Fe_2O_3$ powder. At this time, an added amount of the sodium carboxylate type dispersing agent was set to 0.38% by mass in terms of $Na_2O$ with respect to the total mass of the $Fe_2O_3$ powder and the $SrCO_3$ powder. The specific surface area according to the BET method and the magnetic characteristics of the Sr ferrite particles that were obtained are shown in Table 9. In addition, the firing temperature (T1) and the firing temperature (T2) were set as described in Table 9.

Comparative Examples 6-1 to 6-7

Sintered ferrite magnets of respective Comparative Examples were prepared in the same manner as Example 6-1 except that the sodium carbonate powder was not added to slurry. The specific surface area according to the BET method and the magnetic characteristics of the Sr ferrite particles, which were obtained in respective Comparative Examples, are shown in Table 9. In addition, the firing temperature (T1) and the firing temperature (T2) in respective Comparative Examples were set as described in Table 9. In addition, in Comparative Examples 6-1 and 6-2, a molded body could not be prepared, and thus the sintered Sr ferrite magnet could not be produced.

TABLE 9

|  | Firing temperature T1 (° C.) | Sr ferrite particles | | Firing temperature T2 (° C.) |
|---|---|---|---|---|
|  |  | Specific surface area (m²/g) | $σ_s$ (emu/g) |  |
| Comparative Example 6-1 | 800 | 4.0 | 35.7 | *1 |
| Example 6-1 | 850 | 3.1 | 70.5 | 1160 |
| Example 6-2 | 900 | 2.7 | 73.6 | 1180 |
| Example 6-3 | 950 | 2.2 | 67.6 | 1180 |
| Example 6-4 | 1000 | 1.7 | 67.1 | 1180 |
| Example 6-5 | 1050 | 1.1 | 68.7 | 1200 |
| Example 6-6 | 1100 | 0.8 | 67.6 | 1200 |
| Comparative Example 6-2 | 850 | 4.4 | 50.1 | *1 |
| Comparative Example 6-3 | 900 | 3.8 | 66.3 | 1160 |
| Comparative Example 6-4 | 1000 | 2.9 | 65.5 | 1180 |
| Comparative Example 6-5 | 1100 | 2.2 | 67.0 | 1200 |

TABLE 9-continued

|  | Firing temperature T1 (° C.) | Sr ferrite particles | | Firing temperature T2 (° C.) |
|---|---|---|---|---|
|  |  | Specific surface area (m²/g) | $\sigma_s$ (emu/g) |  |
| Comparative Example 6-6 | 1200 | 1.3 | 68.3 | 1220 |
| Comparative Example 6-7 | 1250 | 0.7 | 68.8 | 1200 |
| Example 6-7 | 850 | 4.6 | 69.1 | 1100 |

In Table, *1 represents that molding could not be performed, and thus a molded body and a sintered magnet were not obtained.

The average particle size of primary particles of the Sr ferrite particles, which were obtained in respective Examples and Comparative Examples shown in Table 9, was measured. As a result, when the firing temperature T1 was 1100° C. or lower, the average particle size was 0.2 to 1 μm in all cases. In contrast, when the firing temperature T1 was 1200° C. or higher, the average particle size exceeded 1 μm.

[Evaluation of Sintered Ferrite Magnet]

The magnetic characteristics and the external appearance of the sintered ferrite magnets of respective Examples and Comparative Examples were evaluated in the same manner as Example 3-1. Results thereof are shown in Table 10. In addition, the surface of the sintered ferrite magnets of respective Examples and Comparative Examples was observed with a naked eye to evaluate whether or not a crack is present with a naked eye (crack evaluation). A case in which the crack was not found was determined as "A", and a case in which the crack was found was determined as "B". The determination results are shown in Table 10.

Figure 11:
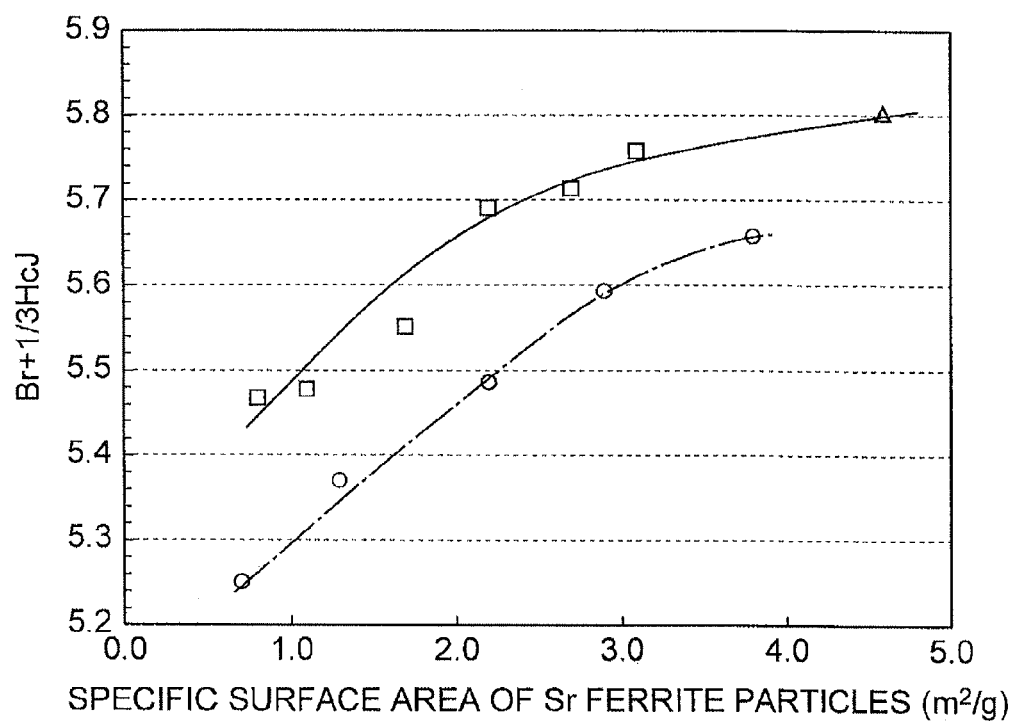
FIG. 11 is a graph illustrating a relationship between a specific surface area of Sr ferrite particles according to a BET method and magnetic characteristics in Examples and Comparative Examples.

FIG. 11 is a graph illustrating a relationship between the specific surface area of the Sr ferrite particles used to prepare the respective sintered Sr ferrite magnets of Examples 6-1 to 6-7 and Comparative Examples 6-2 to 6-6, and the value of Br+⅓HcJ of the sintered Sr ferrite magnets. In FIG. 11, data indicated by a square (□) represents data in a case of producing a sintered Sr ferrite magnet with addition of the sodium carbonate powder, and data indicated by a triangle (Δ) represents data of Example 6-7. Data indicated by a circle (○) represents data in a case of producing a sintered Sr ferrite magnet without addition of the alkali metal compound before the calcination. From data shown in FIG. 11, it was confirmed that even though the specific surface area of the Sr ferrite particles was substantially the same in each case, the sintered Sr ferrite magnet obtained with addition of the alkali metal compound before the calcination had excellent magnetic characteristics in comparison to the sintered Sr ferrite magnet obtained without addition of the alkali metal compound. As a main cause thereof, it is considered that when the alkali metal compound is added before the calcination, generation of the Sr ferrite in the Sr ferrite particle is promoted.

[Preparation of Sintered Ferrite Magnet]

Examples 7-1 to 7-5, and Comparative Examples 7-1 to 7-9

Slurry was obtained in the same manner as Example 1-1. An alkali metal compound shown in Tables 11 and 12 was

TABLE 10

|  | Magnetic characteristics | | | | | | | External appearance | Crack evaluation |
|---|---|---|---|---|---|---|---|---|---|
|  | Br G | bHc Oe | HcJ Oe | (BH)max MGOe | Hk/HcJ % | $\sigma_s$ emu/g | Br + ⅓HcJ |  |  |
| Example 6-1 | 4101 | 3919 | 4969 | 4.06 | 93.2 | 70.0 | 5.76 | A | A |
| Example 6-2 | 4097 | 3906 | 4850 | 4.05 | 91.9 | 69.9 | 5.71 | A | A |
| Example 6-3 | 4104 | 3933 | 4761 | 4.07 | 93.6 | 70.1 | 5.69 | A | A |
| Example 6-4 | 4023 | 3838 | 4585 | 3.90 | 93.9 | 69.9 | 5.55 | A | A |
| Example 6-5 | 4060 | 3865 | 4253 | 3.98 | 95.9 | 70.5 | 5.48 | A | A |
| Example 6-6 | 4074 | 3854 | 4181 | 4.00 | 94.8 | 70.2 | 5.47 | A | A |
| Comparative Example 6-2 | 3981 | 3795 | 5031 | 3.82 | 92.5 | 68.0 | 5.66 | A | B |
| Comparative Example 6-3 | 4022 | 3788 | 4714 | 3.89 | 91.0 | 68.7 | 5.59 | A | B |
| Comparative Example 6-4 | 4057 | 3720 | 4287 | 3.90 | 90.8 | 69.4 | 5.49 | A | B |
| Comparative Example 6-5 | 4173 | 3450 | 3592 | 4.19 | 94.9 | 69.8 | 5.37 | A | A |
| Comparative Example 6-6 | 4147 | 3204 | 3311 | 4.14 | 94.6 | 70.3 | 5.25 | A | A |
| Comparative Example 6-7 | 4203 | 4004 | 4799 | 4.28 | 91.4 | 71.1 | 5.80 | A | A |

In the sintered Sr ferrite magnets of respective Examples, the squareness ratio was high and a value of Br+⅓HcJ was 5.69 or more, and thus it was confirmed that the sintered Sr ferrite magnets had both high Br and high HcJ. In addition, the sintered Sr ferrite magnets of respective Examples had satisfactory external appearance.

added to the slurry. At this time, an added amount of the alkali metal compound was 0.38% by mass in terms of $Na_2O$ with respect to the total mass of the $Fe_2O_3$ powder and the $SrCO_3$ powder. Then, spray drying of the slurry was performed to obtain a granulated powder having a particle size of approximately 10 μm, and then the powder was fired in the air at a firing temperature (T1) shown in Tables 11 and 12 for 1 hour to obtain granular Sr ferrite particles of respective Examples and Comparative Examples. The magnetic characteristic ($\sigma_s$: emu/g) of the Sr ferrite that was obtained was measured by using the vibration sample type magnetometer. Measured results are shown in Tables 11 and 12.

TABLE 11

|  | Firing temperature T1 (° C.) | Alkali metal compounds | | |
| --- | --- | --- | --- | --- |
|  |  | A σs emu/g | B σs emu/g | C σs emu/g |
| Comparative Example 7-1 | 800 | 53.2 | 56.4 | 41.9 |
| Example 7-1 | 850 | 69.9 | 69.6 | 69.5 |
| Example 7-2 | 900 | 71.4 | 68.6 | 72.7 |
| Example 7-3 | 950 | 68.9 | 69.9 | 70.5 |
| Example 7-4 | 1000 | 70.8 | 70.5 | 70.9 |
| Example 7-5 | 1100 | 69.1 | 71.6 | 70.7 |
| Comparative Example 7-2 | 1200 | 69.3 | 71.8 | 70.0 |

A: Sodium polycarboxylate (commercially available product)
B: Sodium polycarboxylate (commercially available product)
C: Sodium polycarboxylate (commercially available product)
A, B, and C are commercially available alkali metal compounds that are different from each other.

TABLE 12

|  | Firing temperature T1 (° C.) | Alkali metal compounds | | |
| --- | --- | --- | --- | --- |
|  |  | D σs emu/g | E σs emu/g | F σs emu/g |
| Comparative Example 7-3 | 800 | 7.3 | 3.7 | 3.6 |
| Comparative Example 7-4 | 850 | 59.0 | 61.5 | 61.5 |
| Comparative Example 7-5 | 900 | 60.2 | 62.8 | 61.9 |
| Comparative Example 7-6 | 950 | 62.7 | 63.5 | 64.1 |
| Comparative Example 7-7 | 1000 | 64.6 | 64.6 | 65.0 |
| Comparative Example 7-8 | 1100 | 65.5 | 67.7 | 67.8 |
| Comparative Example 7-9 | 1200 | 69.2 | 69.8 | 70.7 |

D: Sodium salt of specific aromatic sulfonic acid formalin condensate (commercially available product)
E: Sodium salt of β naphthalenesulfonic acid formalin condensate (commercially available product)
F: Sodium salt of β naphthalenesulfonic acid formalin condensate (commercially available product)
E, and F are commercially available alkali metal compounds different from each other.

The average particle size of primary particles of the Sr ferrite particles, which were obtained in respective Examples and Comparative Examples shown in Tables 11 and 12, was measured. As a result, in a case where the firing temperature T1 was 1100° C. or lower, the average particle size was 0.2 to 1 μm in all cases. In contrast, in a case where the firing temperature T1 was 1200° C., the average particle size exceeded 1 μm.

As shown in FIG. 11, in a case of using the alkali metal compounds A, B, and C, even at a low firing temperature (T1), Sr ferrite particles having high magnetic characteristics could be obtained. On the other hand, as shown in FIG. 12, in a case of using the alkali metal compounds D, E, and F, Sr ferrite particles having high magnetic characteristics could not be obtained at a low firing temperature T1.

A molded body was prepared in the same manner as Example 3-1 by using the Sr ferrite particles (Example 7-2) prepared at the firing temperature (t1) of 900° C. among the Sr ferrite particles that were prepared as described above. The molded body was fired in the air at the firing temperature (T2) shown in Table 13 for 1 hour to obtain sintered ferrite magnets of Examples 7-2-1 to 7-2-3. In addition, a molded body was prepared in the same manner as Example 3-1 by using the Sr ferrite particles that were prepared in Example 1-3. The molded body was fired in the air at the firing temperature (T2) shown in Table 13 for 1 hour to obtain sintered ferrite magnets of Examples 1-3-1 and 1-3-2.

The magnetic characteristics and the external appearance of the sintered ferrite magnets of respective Examples were evaluated in the same manner as Example 3-1. Results thereof are shown in Table 13.

TABLE 13

|  | Firing temperature T2 (° C.) | Alkali metal compound | Br G | bHc Oe | HcJ Oe | (BH)max MGOe | 4PImax G | Hk/HcJ % | Br + ⅓HcJ | External appearance |
| --- | --- | --- | --- | --- | --- | --- | --- | --- | --- | --- |
| Example 7-2-1 | 1170 | A | 4143 | 3971 | 4801 | 4.16 | 4292 | 93.4 | 5.74 | A |
| Example 7-2-2 | 1170 | B | 4138 | 3965 | 4825 | 4.15 | 4292 | 92.8 | 5.75 | A |
| Example 7-2-3 | 1170 | C | 4104 | 3937 | 4854 | 4.08 | 4257 | 93.5 | 5.72 | A |
| Example 1-3-1 | 1160 | $Na_2CO_3$ | 4084 | 3913 | 4953 | 4.03 | 4252 | 95.5 | 5.74 | A |
| Example 1-3-2 | 1150 | $Na_2CO_3$ | 4102 | 3933 | 4899 | 4.07 | 4268 | 94.0 | 5.74 | A |

A: Sodium polycarbonate (commercially available product)
B: Sodium polycarbonate (commercially available product)
C: Sodium polycarbonate (commercially available product)

As shown in Table 13, in all Examples, a sintered ferrite magnet, in which the magnetic characteristics were high and which had satisfactory external appearance, could be obtained.

[Analysis of Generated Phase]

A granular mixture was prepared by performing spray drying of slurry in the same manner as Example 1-1 except that the alkali metal compound was not added (Reference Example 1). In addition, granular mixtures were prepared by using the sodium carbonate powder or the sodium orthosilicate powder as the alkali metal compound and by performing the spray drying of slurry in the same manner as Example 1-1 (Reference Examples 2 to 4). An added amount of the alkali metal compound was set as described in Tables 14 and 15 in terms of $Na_2O$ with respect to the total mass of the $Fe_2O_3$ powder and the $SrCO_3$ powder. In addition, a granular mixture was prepared by performing the spray drying of slurry in the same manner as Example 1-1 except that the alkali metal compound was not added (Reference Example 4).

A temperature of the granular mixture that was prepared was raised in the air, and a generated phase during temperature-rising was analyzed by high-temperature X-ray diffraction analysis. Temperatures during measurement and crystal phases that were detected at respective temperature are shown in Tables 14 and 15.

TABLE 14

| | Reference Example 1 | | | | | Reference Example 2 | | | | |
|---|---|---|---|---|---|---|---|---|---|---|
| | Alkali metal compound | | | | | | | | | |
| | Without | | | | | $Na_2CO_3$ powder | | | | |
| | Added amount of Na | | | | | | | | | |
| Temperature | 0 | | | | | 0.29 | | | | |
| (° C.) | $\alpha$-$Fe_2O_3$ | $SrCO_3$ | Sr-rich | $Na_2O$ | SrM | $\alpha$-$Fe_2O_3$ | $SrCO_3$ | Sr-rich | $Na_2O$ | SrM |
| 25 | D | D | ND | ND | ND | D | D | ND | ND | ND |
| 200 | D | D | ND | ND | ND | D | D | ND | ND | ND |
| 400 | D | D | ND | ND | ND | D | D | ND | ND | ND |
| 600 | D | D | ND | ND | ND | D | D | ND | ND | ND |
| 700 | D | D | ND | ND | ND | D | ND | ND | D | ND |
| 750 | D | D | D | ND | ND | D | ND | D | D | ND |
| 800 | D | ND | D | ND | ND | ND | ND | D | D | D |
| 850 | ND | ND | D | ND | D | ND | ND | ND | ND | D |
| 900 | ND | ND | ND | ND | D | ND | ND | ND | ND | D |
| 950 | ND | ND | ND | ND | D | ND | ND | ND | ND | D |
| 1000 | ND | ND | ND | ND | D | ND | ND | ND | ND | D |

In Table, the added amount of Na represents a mass ratio (% by mass) in terms of $Na_2O$.
In Table, "D" represents "detected", and "ND" represents "non-detected".
"SrM" represents Sr ferrite, and "Sr-rich" represents a strontium-rich intermediate phase, which is generated during generation of the SrM, by a reaction between $Fe_2O_3$ and $SrCO_3$.

TABLE 15

| | Reference Example 3 | | | | | Reference Example 4 | | | | |
|---|---|---|---|---|---|---|---|---|---|---|
| | Alkali metal compound | | | | | | | | | |
| | $Na_2CO_3$ powder | | | | | Sodium orthosilicate | | | | |
| | Added amount of Na | | | | | | | | | |
| Temperature | 0.58 | | | | | 0.38 | | | | |
| (° C.) | $\alpha$-$Fe_2O_3$ | $SrCO_3$ | Sr-rich | $Na_2O$ | SrM | $\alpha$-$Fe_2O_3$ | $SrCO_3$ | Sr-rich | $Na_2O$ | SrM |
| 25 | D | D | ND | ND | ND | D | D | ND | ND | ND |
| 200 | D | D | ND | ND | ND | D | D | ND | ND | ND |
| 400 | D | D | ND | ND | ND | D | D | ND | ND | ND |
| 600 | D | D | ND | D | ND | D | D | ND | D | ND |
| 700 | D | ND | ND | D | ND | D | ND | ND | D | ND |
| 750 | D | ND | ND | D | ND | D | ND | ND | D | ND |
| 800 | ND | ND | ND | D | D | ND | ND | ND | D | D |
| 850 | ND | ND | ND | ND | D | ND | ND | ND | D | D |
| 900 | ND | ND | ND | ND | D | ND | ND | ND | ND | D |
| 950 | ND | ND | ND | ND | D | ND | ND | ND | ND | D |
| 1000 | ND | ND | ND | ND | D | ND | ND | ND | ND | D |

In Table, the added amount of Na represents a mass ratio (% by mass) in terms of $Na_2O$.
In Table, "D" represents "detected", and "ND" represents "non-detected".
"SrM" represents Sr ferrite, and "Sr-rich" represents a strontium-rich intermediate phase, which is generated during generation of the SrM, by a reaction between $Fe_2O_3$ and $SrCO_3$.

From the results shown in Tables 14 and 15, it was confirmed that when the alkali metal compound was added, a decomposition temperature of $SrCO_3$ was lowered, and generation of the Sr ferrite was promoted.

[Measurement of Thermal Decomposition Temperature]

Granular mixtures were prepared by using a potassium carbonate powder, a potassium silicate powder, a lithium carbonate powder, or a sodium salt of β naphthalenesulfonic acid formalin condensate (commercially available product) as the alkali metal compound and by performing the spray drying of slurry in the same manner as Example 1-1 (Reference Examples 5 to 9). An added amount of alkali metal compound was set as described in Table 16 in terms of $Na_2O$ with respect to the total mass of the $Fe_2O_3$ powder and the $SrCO_3$ powder.

TABLE 16

| | Alkali metal compound | $Na_2O$ or $K_2O$ (% by mass) |
| --- | --- | --- |
| Reference Example 5 | Sodium carbonate powder | 0.88 |
| Reference Example 6 | Sodium carbonate powder | 0.38 |
| Reference Example 7 | Potassium carbonate powder | 0.38 |
| Reference Example 8 | Potassium silicate powder | 0.38 |
| Reference Example 9 | Lithium carbonate powder | 0.38 |
| Reference Example 10 | Sodium salt of β naphthalenesulfonic acid formalin condensate | 0.38 |

Figure 13:
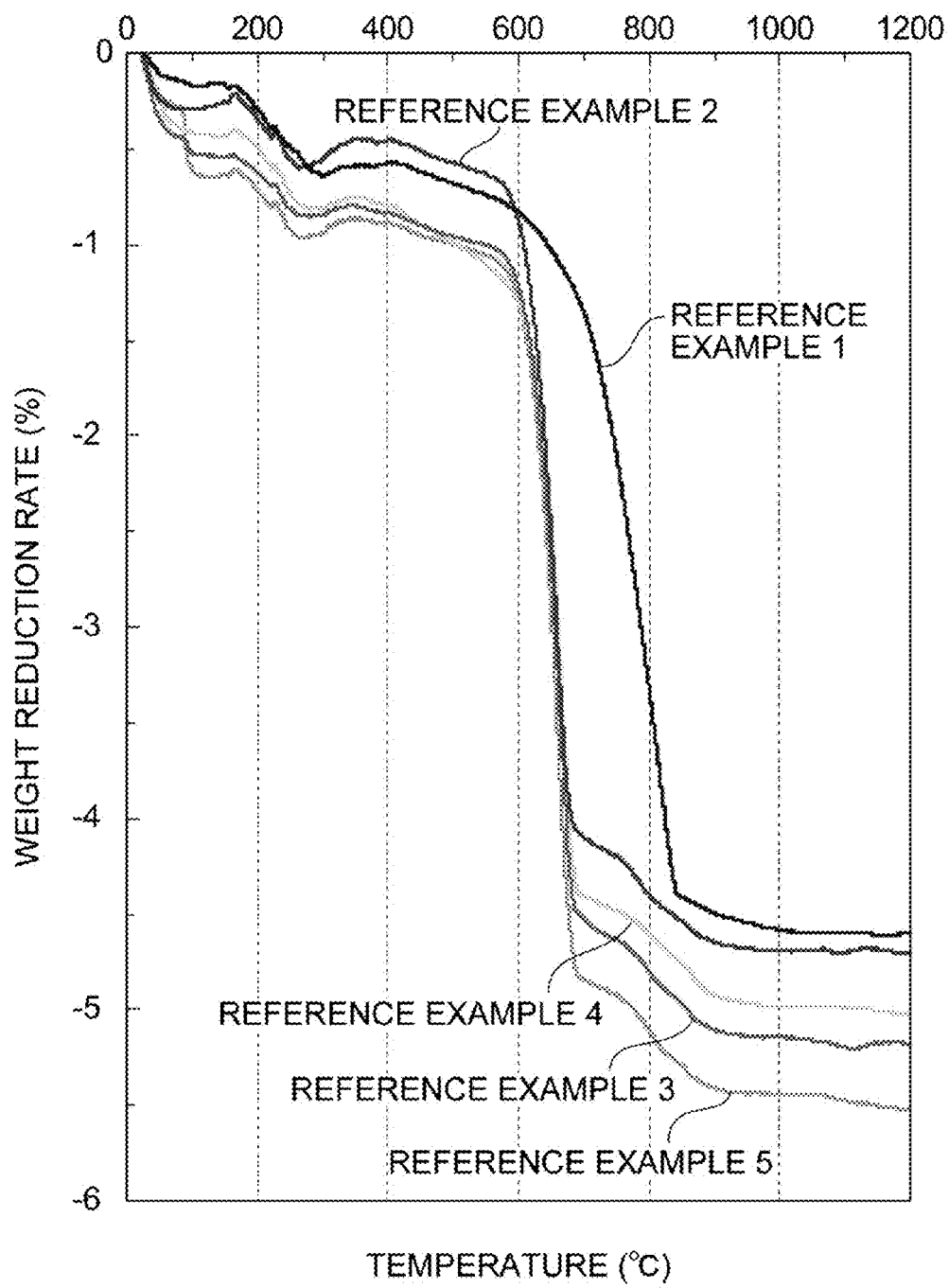
FIG. 13 is a graph illustrating thermal decomposition analysis result of respective Reference Examples.
Figure 14:
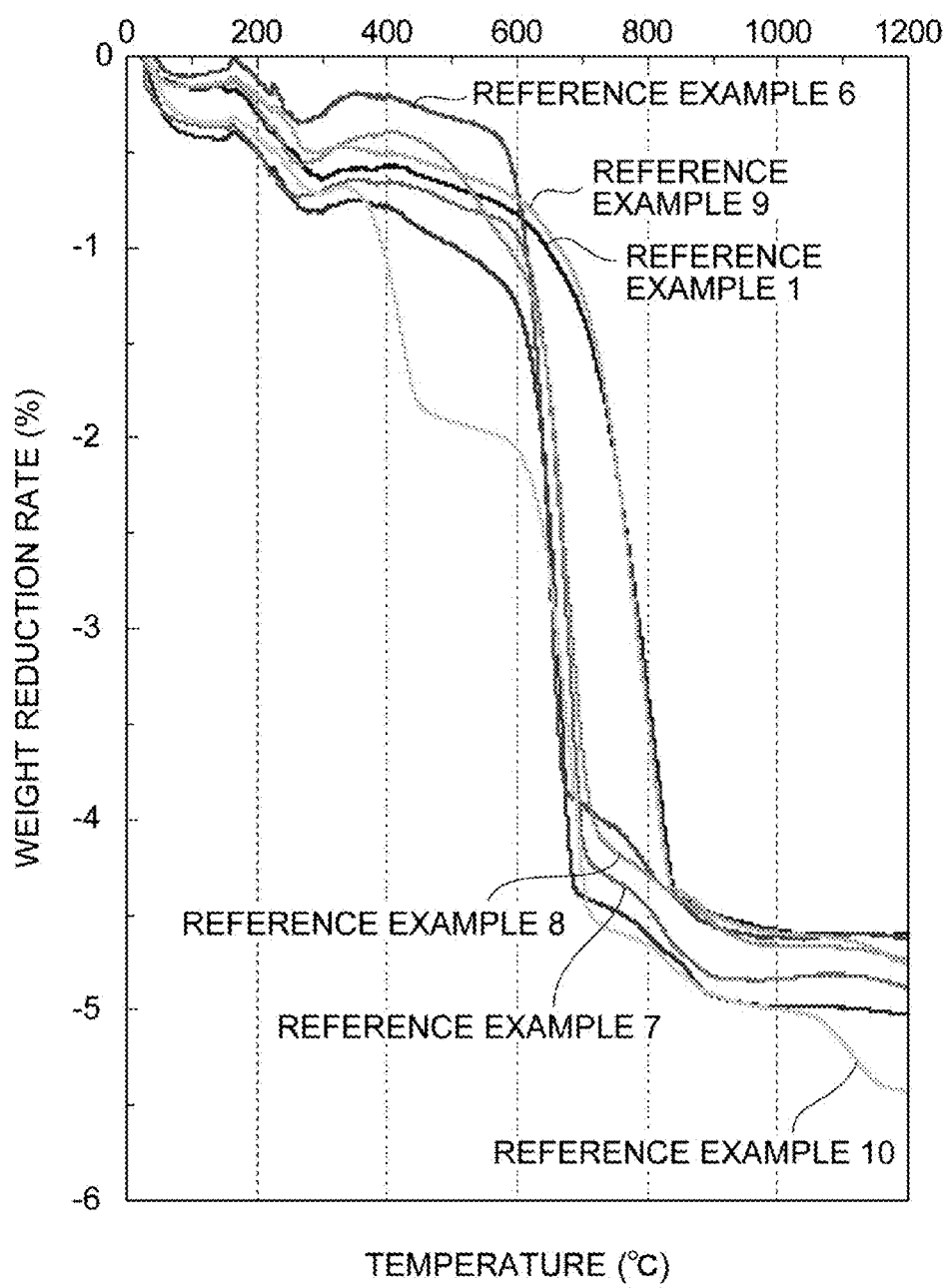
FIG. 14 is a graph illustrating the thermal decomposition analysis results of the respective Reference Examples.

Thermal decomposition analysis (TG) of the mixtures prepared in Reference Examples 1 to 10 was performed. Results thereof are shown in FIGS. 13 and 14. From the results, it was confirmed that the Sr ferrite was generated from the mixtures, which were prepared by using the alkali metal compound containing Na or K as a constituent element, at a low temperature. On the other hand, in Reference Example 8 in which the $LiCO_3$ powder was added, the effect of promoting generation of the Sr ferrite was not found.

INDUSTRIAL APPLICABILITY

According to the invention, it is possible to provide a method of producing a sintered Sr ferrite magnet which is capable of producing the sintered Sr ferrite magnet having high magnetic characteristics and high reliability with a simple process. In addition, it is possible to provide a sintered Sr ferrite magnet having high magnetic characteristics and high reliability. Furthermore, it is possible to provide a motor and a generator which have high efficiency and high reliability.

REFERENCE SIGNS LIST

10: Sintered ferrite magnet, 30: Motor, 31: Housing, 32: Rotor, 33: Bracket, 34, 35: Bearing, 36: Rotor axis, 37: Rotor core.

The invention claimed is:

1. A method for producing a sintered Sr ferrite magnet, wherein Sr ferrite particles, which are obtained by a method for producing Sr ferrite particles for sintered magnets, are used, the method for producing Sr ferrite particles for sintered magnets, comprising:

a mixing step of mixing an iron compound, a strontium compound, and an alkali metal compound which includes at least one kind of element selected from K and Na as a constituent element and which does not include Cl and S as the constituent element to prepare a mixture; and a calcining step of firing the mixture at 850 to 1100° C. to obtain Sr ferrite particles in which an average particle size of primary particles is 0.2 to 1.0 μm, wherein in the mixing step, the alkali metal compound is mixed in such a manner that a total amount of K and Na becomes 0.03 to 1.05% by mass in terms of $K_2O$ and $Na_2O$ with respect to a total amount of a powder of the iron compound and a powder of the strontium compound, and wherein the sintered Sr ferrite magnet contains crystal grains of M-type Sr ferrite having a hexagonal structure as a main component.

2. A method for producing a sintered Sr ferrite magnet, comprising:

a fine pulverizing step of wet-pulverizing Sr ferrite particles which are obtained by a method for producing Sr ferrite particles for sintered magnets described below;

a molding step of wet-molding the Sr ferrite particles that are wet-pulverized to prepare a molded body; and a sintering step of firing the molded body at 1000 to 1250° C. to obtain a sintered magnet, the method for producing Sr ferrite particles for sintered magnets, comprising:

a mixing step of mixing an iron compound, a strontium compound, and an alkali metal compound which includes at least one kind of element selected from K and Na as a constituent element and which does not include Cl and S as the constituent element to prepare a mixture; and a calcining step of firing the mixture at 850 to 1100° C. to obtain Sr ferrite particles in which an average particle size of primary particles is 0.2 to 1.0 μm, wherein in the mixing step, the alkali metal compound is mixed in such a manner that a total amount of K and Na becomes 0.03 to 1.05% by mass in terms of $K_2O$ and $Na_2O$ with respect to a total amount of a powder of the iron compound and a powder of the strontium compound, and wherein the sintered Sr ferrite magnet contains crystal grains of M-type Sr ferrite having a hexagonal structure as a main component.

3. The method for producing a sintered Sr ferrite magnet according to claim 1, wherein in the sintered Sr ferrite magnet, an average grain size of crystal grains of the Sr ferrite is 0.6 μm or less, and a ratio of crystal grains, which have a grain size of 1.8 μm or more, on the number basis is 1% or less.

4. The method for producing a sintered Sr ferrite magnet according to claim 1, wherein the following Expression (1) is satisfied, $$Br+⅓HcJ≥5.5 \tag{1}$$

[In Expression (1), Br and Ha represent a residual magnetic flux density (kG) and a coercive force (kOe), respectively].

5. The method for producing a sintered Sr ferrite magnet according to claim 1, wherein a squareness ratio is 80% or more.

6. A motor comprising:

the sintered Sr ferrite magnet that is obtained by the method for producing according to claim 1.

7. A generator comprising:

the sintered Sr ferrite magnet that is obtained by the method for producing according to claim 1.

8. A sintered Sr ferrite magnet containing crystal grains of M-type Sr ferrite having a hexagonal structure as a main component, comprising;
- an alkali metal compound which includes at least one kind of element selected from K and Na and which does not include Cl and S as a constituent element,
- wherein a total amount of K and Na is 0.17% by mass or less in terms of $K_2O$ and $Na_2O$,
- an average grain size of Sr ferrite crystal grains is 0.6 μm or less, and
- a ratio of crystal grains, which have a grain size of 1.8 μm or more, on the number basis is 1% or less.

9. The motor comprising:
the sintered Sr ferrite magnet according to claim 8.

10. A generator comprising:
the sintered Sr ferrite magnet according to claim 8.

* * * * *